United States Patent
Seok et al.

(10) Patent No.: US 12,292,578 B2
(45) Date of Patent: May 6, 2025

(54) ELECTRONIC DEVICE INCLUDING STRUCTURE FOR ADJUSTING DISTANCE BETWEEN LENSES

(71) Applicant: Samsung Electronics Co., Ltd., Suwon-si (KR)

(72) Inventors: Sangyoup Seok, Suwon-si (KR); Gyeongtae Kim, Suwon-si (KR); Heebo Shim, Suwon-si (KR); Dongoh Lee, Suwon-si (KR); Seunghoon Lee, Suwon-si (KR); Changmin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/619,800

(22) Filed: Mar. 28, 2024

(65) Prior Publication Data

US 2025/0028178 A1  Jan. 23, 2025

Related U.S. Application Data

(63) Continuation of application No. PCT/KR2024/003640, filed on Mar. 22, 2024.

(30) Foreign Application Priority Data

Jul. 18, 2023 (KR) .................. 10-2023-0093032
Sep. 5, 2023 (KR) .................. 10-2023-0117747

(51) Int. Cl.
*G09G 3/00* (2006.01)
*G02B 7/02* (2021.01)
*G02B 27/01* (2006.01)

(52) U.S. Cl.
CPC ......... *G02B 27/0176* (2013.01); *G02B 7/023* (2013.01); *G02B 2027/0154* (2013.01)

(58) Field of Classification Search
CPC ............ G06F 1/163; G02B 2027/0138; G02B 2027/014; G02B 2027/0154;
(Continued)

(56) References Cited

U.S. PATENT DOCUMENTS 6,078,436 A   6/2000   Hirunuma et al.
9,405,128 B2  8/2016   Kim et al.
(Continued)

FOREIGN PATENT DOCUMENTS

CN   212181173 U    12/2020
JP   H10-301035 A   11/1998
(Continued)

OTHER PUBLICATIONS

International Search Report dated Jul. 10, 2024, issued in International Application No. PCT/KR2024/003640.

*Primary Examiner* — Insa Sadio
(74) *Attorney, Agent, or Firm* — Jefferson IP Law, LLP

(57) ABSTRACT

An electronic device is provided. The electronic device includes a first lens support, a second lens support movable with respect to the first lens support, a first moving member coupled to the first lens support to move together with the first lens support, a second moving member coupled to the second lens support to move together with the second lens support, a plurality of friction members penetrating the first moving member and the second moving member and movable with respect to each other, and at least one deforming member disposed between the plurality of friction members and configured to press each of the plurality of friction members in a direction away from each other friction member.

20 Claims, 29 Drawing Sheets

(58) Field of Classification Search
CPC .... G02B 2027/0161; G02B 2027/0178; G02B 23/18; G02B 25/001; G02B 27/0006; G02B 27/0093; G02B 27/0172; G02B 27/0176; G02B 27/0179; G09G 3/20; G09G 5/00; G09G 5/36; H04N 5/64
See application file for complete search history.

(56) References Cited

U.S. PATENT DOCUMENTS

| | | |
|---|---|---|
| 9,927,619 B2 | 3/2018 | Wang |
| 10,324,295 B2 | 6/2019 | Tatsuta et al. |
| 10,595,011 B2 | 3/2020 | Han et al. |
| 11,624,930 B2 | 4/2023 | Yamamoto et al. |
| 2004/0113867 A1* | 6/2004 | Tomine .............. G02B 27/0172 345/8 |
| 2011/0050655 A1* | 3/2011 | Mukawa .............. G02B 27/017 345/204 |

FOREIGN PATENT DOCUMENTS

| | | |
|---|---|---|
| KR | 10-2013-0020515 A | 2/2013 |
| KR | 10-1875313 B1 | 7/2018 |
| KR | 10-2023-0098742 A | 7/2023 |
| WO | 2022/071975 A1 | 4/2022 |

\* cited by examiner

ELECTRONIC DEVICE INCLUDING STRUCTURE FOR ADJUSTING DISTANCE BETWEEN LENSES

CROSS-REFERENCE TO RELATED APPLICATION(S)

This application is a continuation application, claiming priority under § 365(c), of an International application No. PCT/KR2024/003640, filed on Mar. 22, 2024, which is based on and claims the benefit of a Korean patent application number 10-2023-0093032, filed on Jul. 18, 2023, in the Korean Intellectual Property Office, and of a Korean patent application number 10-2023-0117747, filed on Sep. 5, 2023, in the Korean Intellectual Property Office, the disclosure of each of which is incorporated by reference herein in its entirety.

TECHNICAL FIELD

The disclosure relates to an electronic device including a structure for adjusting a distance between lenses.

BACKGROUND ART

As user's demands for an electronic device become varied, the forms of the electronic device are also becoming diverse. For example, the electronic device may be referred to as a head mounted display device providing various visual information to the user while being worn on the user's head. When the electronic device is referred to as the head mounted display device, the electronic device may include a structure capable of adjusting a relative position between components to correspond to the user's body.

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide an electronic device including a structure for adjusting a distance between lenses.

Additional aspects will be set forth in part in the description which follows and, in part, will be apparent from the description, or may be learned by practice of the presented embodiments.

In accordance with an aspect of the disclosure, an electronic device is provided. The electronic device includes a first lens support, a second lens support movable with respect to the first lens support, a first moving member coupled to the first lens support to move together with the first lens support, a second moving member coupled to the second lens support to move together with the second lens support, a plurality of friction members penetrating the first moving member and the second moving member and movable with respect to each other, and at least one deforming member disposed between the plurality of friction members and configured to press each of the plurality of friction members in a direction away from each other friction member.

In accordance with another aspect of the disclosure, a head mounted display device is provided. The head mounted display device includes a first lens support coupled to a first lens aligned with an eye of a user when the head mounted display device is worn by the user, a second lens support movable with respect to the first lens support and coupled to a second lens aligned with another eye of the user when the head mounted display device is worn by the user, a first moving member coupled to the first lens support to move together with the first lens support, a second moving member coupled to the second lens support to move together with the second lens support, a plurality of friction members extending in a moving direction of the first lens support and the second lens support to penetrate the first moving member and the second moving member and movable with respect to each other, and at least one deforming member disposed between the plurality of friction members and configured to press each of the plurality of friction members in a direction perpendicular to the moving direction.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
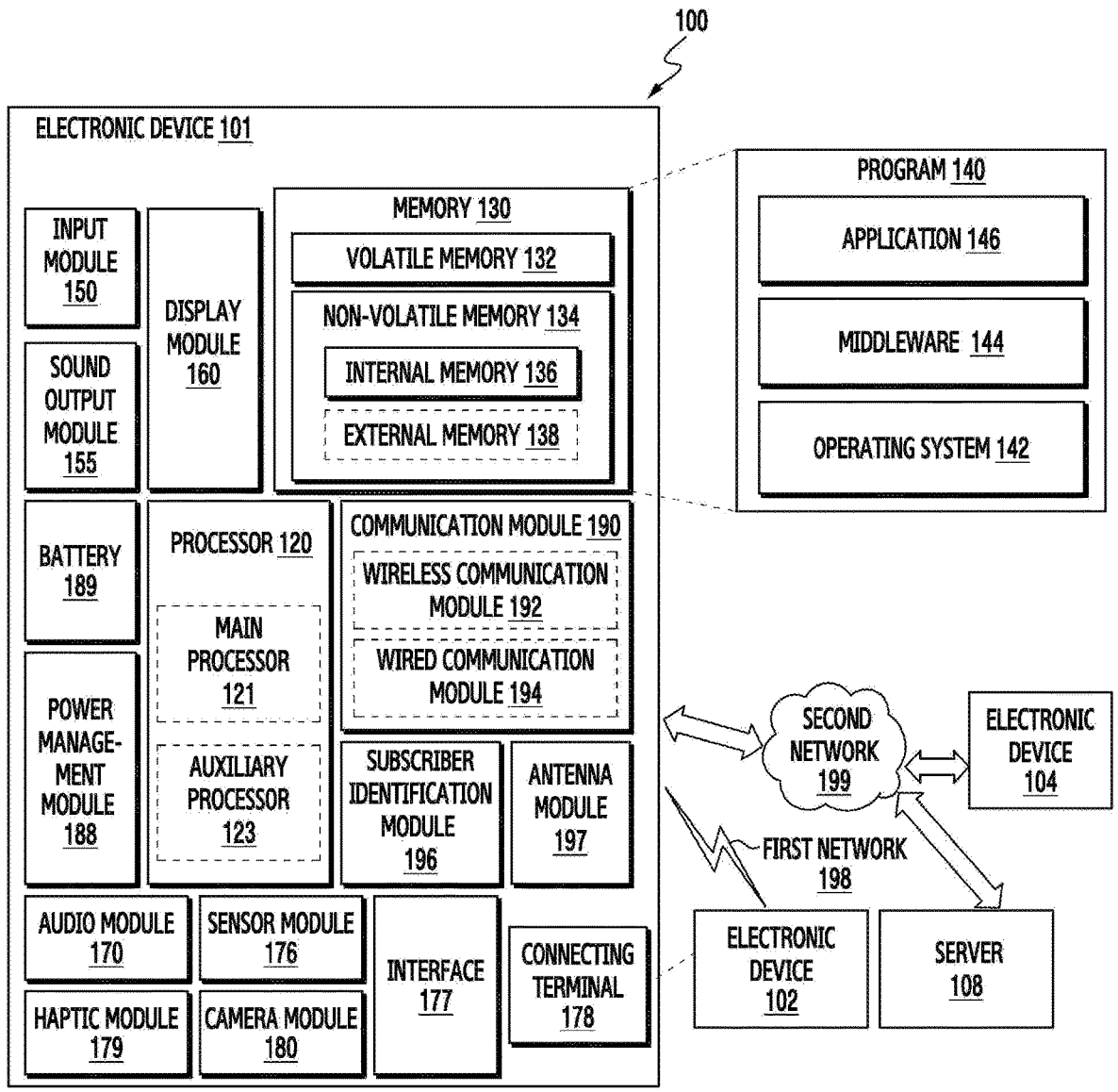
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, an USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
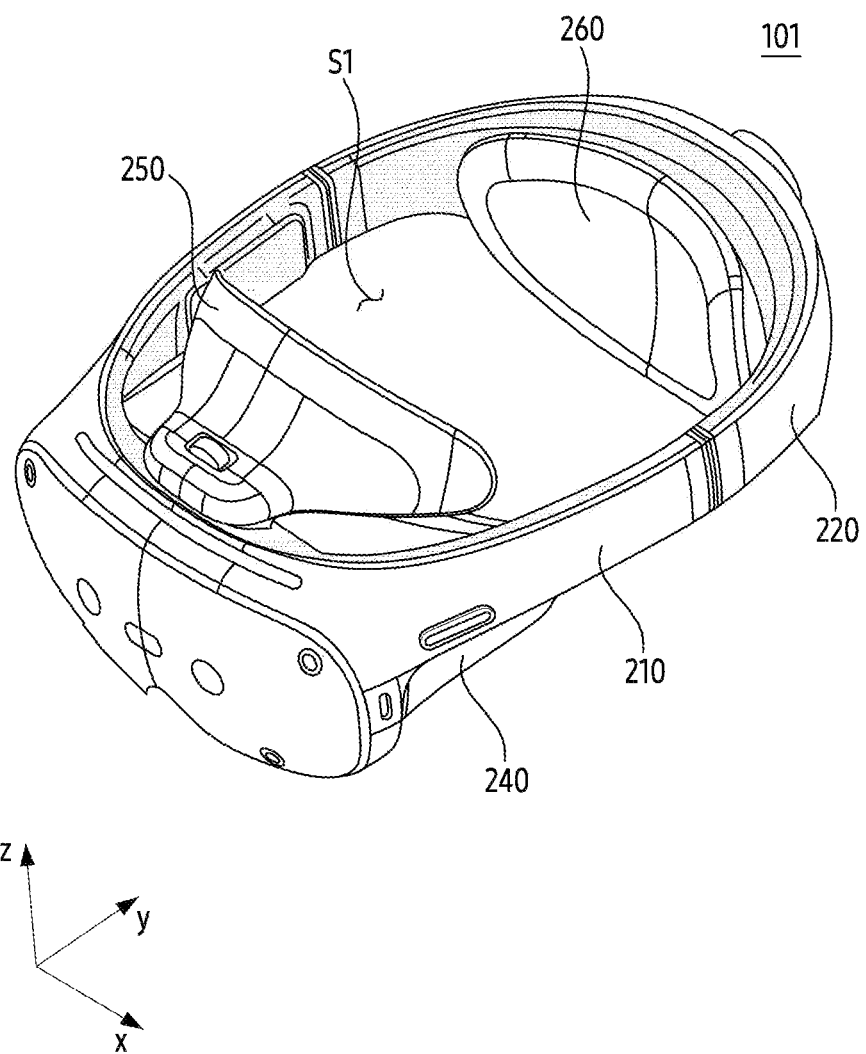
FIG. 2A is a perspective view of an electronic device according to an embodiment of the disclosure.
Figure 2B:
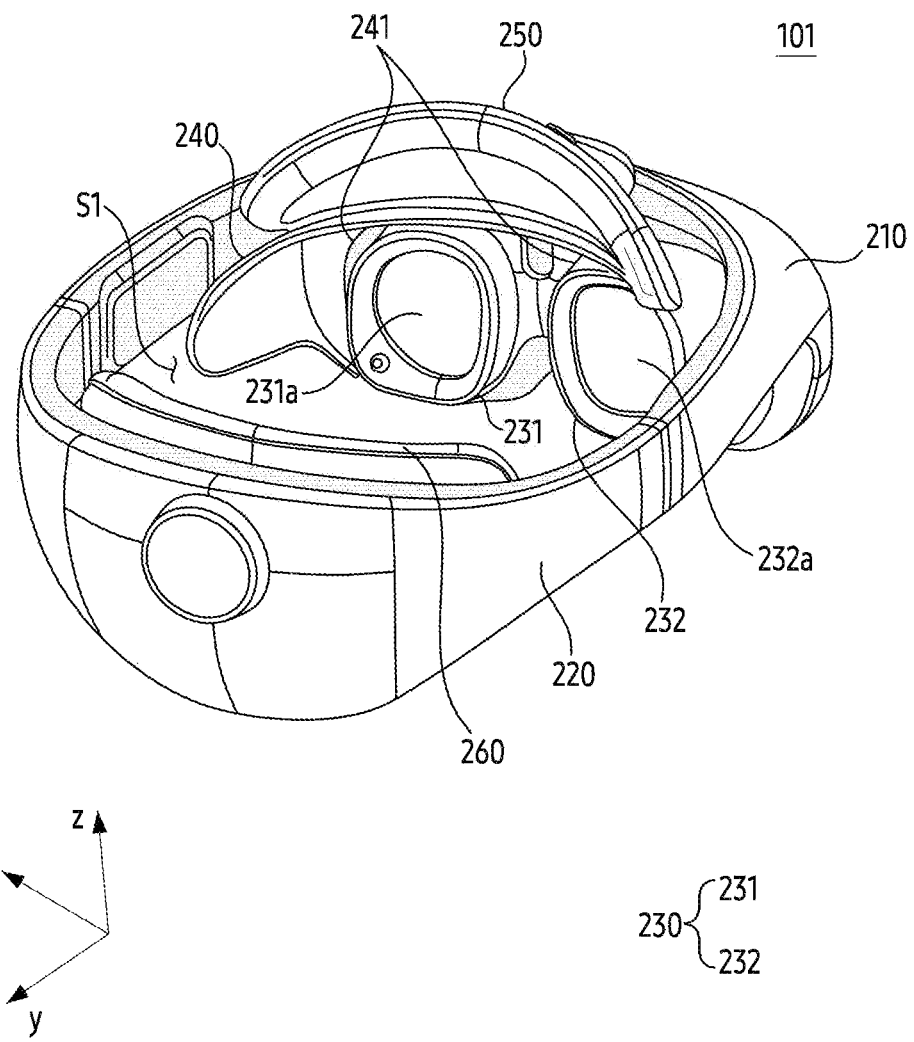
FIG. 2B is a perspective view of an electronic device according to an embodiment of the disclosure.
Figure 2C:
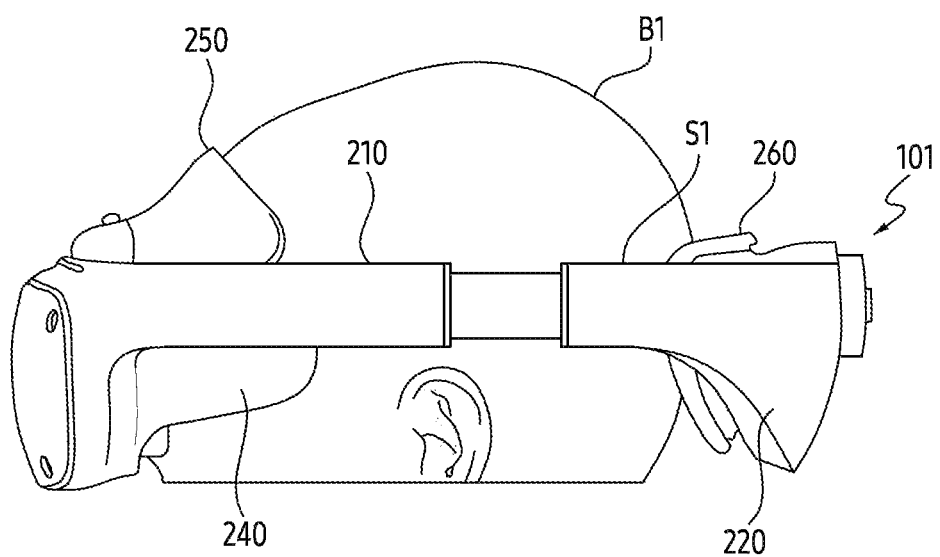
FIG. 2C illustrates a state in which an electronic device is worn by a user according to an embodiment of the disclosure.

FIG. 2A is a perspective view of an electronic device according to an embodiment of the disclosure. FIG. 2B is a perspective view of an electronic device according to an embodiment of the disclosure. FIG. 2C illustrates a state in which an electronic device according to an embodiment is worn by a user according to an embodiment of the disclosure.

Referring to FIGS. 2A, 2B, and 2C, according to an embodiment of the disclosure, an electronic device 101 may include a first housing 210, a second housing 220, a plurality of lens supports 230, a cover 240, a first pad 250, and/or a second pad 260. According to an embodiment of the disclosure, the electronic device 101 may be referred to as a wearable device worn on a part b1 of a user's body. For example, the electronic device 101 may be worn on the user's head.

According to an embodiment of the disclosure, the electronic device 101 may be configured to provide a user with augmented reality (AR), virtual reality (VR), or mixed reality (MR) combining the augmented reality and the virtual reality. For example, the electronic device 101 may be configured to provide virtual reality (or virtual space) to the user, based on receiving data about an image from outside of the electronic device 101. Virtual reality may be represented based on two dimensions and/or three dimensions. For example, an image provided by the electronic device 101 may include a still image and/or video for realizing virtual reality. For example, the electronic device 101 may be configured to provide augmented reality to the user, by superimposing a virtual object on a real image representing an external environment of the electronic device 101. The real image may correspond to the external environment. The virtual object may include at least one of text and image corresponding to various information related to an object included in the real image. However, it is not limited thereto, and the virtual object may include at least one of text and image corresponding to various information related to another object distinguished from the object included in the real image. For example, the electronic device 101 may be referred to as at least one of a virtual reality (VR) device and a mixed reality (MR) device. For example, since the electronic device 101 may be worn on the user's head, it may be referred to as a head mounted display device (HMD device).

According to an embodiment of the disclosure, the first housing 210 may form (or define) a part of an outer surface of the electronic device 101. The first housing 210 may form (or define) a part of a space in which various components of the electronic device 101 may be disposed. The first housing 210 may support various components of the electronic device 101. For example, the plurality of lens supports 230, the cover 240, and/or the first pad 250 may be coupled to the first housing 210. The first housing 210 may surround (or cover) the part b1 of the user's body while the electronic device 101 is worn by the user. For example, the first housing 210 may at least partially accommodate the part b1 of the user's body while the electronic device 101 is worn by the user. For example, the first housing 210 may be in contact with the part b1 of the user's body while the electronic device 101 is worn by the user, but is not limited thereto. For example, the first housing 210 may be referred to as a main housing. For example, since the first housing 210 provides the overall framework of the electronic device 101, it may be referred to as a frame.

According to an embodiment of the disclosure, the second housing 220 may form (or define) another part of the outer surface of the electronic device 101. The second housing 220 may form (or define) another part of a space in which various components of the electronic device 101 may be disposed. The second housing 220 may support various components of the electronic device 101. For example, the second housing 220 may support the second pad 260. The second pad 260 may be disposed on the second housing 220. The second housing 220 may surround (or cover) the part b1 of the user's body while the electronic device 101 is worn by the user. For example, the second housing 220 may at least partially accommodate the part b1 of the user's body while the electronic device 101 is worn by the user. For example, the second housing 220 may be in contact with the part b1 of the user's body while the electronic device 101 is worn by the user, but is not limited thereto. The second housing 220 may be movable with respect to the first housing 210. For example, the second housing 220 may be movable with respect to the first housing 210 so that the part b1 of the user's body is accommodated in a space s1 between the first housing 210 and the second housing 220. For example, the second housing 220 may be movable with respect to the first housing 210 so that it is close to the first housing 210 or away from the first housing 210. As the second housing 220 is movable with respect to the first housing 210, a size of the space s1 between the first housing 210 and the second housing 220 may be adjusted (or changed) to correspond to a size of the part b1 of the user's body. The second housing 220 may be referred to as a sub-housing. The second housing 220 may be referred to as a band housing.

According to an embodiment of the disclosure, each of the plurality of lens supports 230 may correspond to the user's eyes of the electronic device 101. Each of the plurality of lens supports 230 may face the user's eyes while the electronic device 101 is worn by the user. Each of the plurality of lens supports 230 may be coupled to the first housing 210. For example, a part of each of the plurality of lens supports 230 may be disposed (or accommodated) inside the first housing 210. For example, another part of each of the plurality of lens supports 230 may protrude outside the first housing 210. The plurality of lens supports 230 may include a first lens support 231 and a second lens support 232.

According to an embodiment of the disclosure, the first lens support 231 may be movable with respect to the first housing 210 to face the user's eye. The first lens support 231 may be aligned with the user's eye while the electronic device 101 is worn on the user. For example, the first lens support 231 may be movable with respect to the first housing 210 to be close to or away from the second lens support 232. The first lens support 231 may be coupled to a first lens 231a. The first lens 231a may refract (or distort) light emitted from at least one display of the electronic device 101 so that the electronic device 101 may provide virtual reality. The first lens 231a may be exposed to the outside of the first housing 210. The first lens 231a may be disposed outside the first housing 210.

According to an embodiment of the disclosure, the second lens support 232 may be movable with respect to the first housing 210 to face the user's other eye. The second lens support 232 may be aligned with the user's other eye while the electronic device 101 is worn on the user. For example, the second lens support 232 may be movable with respect to the first housing 210 to be close or away from the first lens support 231. As the first lens support 231 and the second lens support 232 are movable with respect to each other, a distance between the first lens 231a and a second lens 232a may be adjusted to correspond to an inter pupillary distance (IPD) of the user. The second lens support 232 may be coupled to the second lens 232a. The second lens 232a may refract (or distort) light emitted from at least one display of the electronic device 101 so that the electronic device 101 may provide virtual reality. The second lens 232a may be exposed to the outside of the first housing 210. The second lens 232a may be disposed outside the first housing 210.

According to an embodiment of the disclosure, the cover 240 may reduce (or suppress) dispersing light passing through the first lens 231a and the second lens 232a to the outside of the cover 240, in a state that the electronic device 101 is worn by the user. As the cover 240 reduces transfer of light passing through the first lens 231a and the second lens 232a to the outside of the cover 240, an environment in which the user of the electronic device 101 may be immersed in virtual reality may be provided. The cover 240 may cover (or surround) the part b1 of the user's body while the electronic device 101 is worn by the user. For example, the cover 240 may be in contact with the part b1 of the user's body while the electronic device 101 is worn by the user. The cover 240 may be disposed on the first housing 210. For example, the cover 240 may be disposed on a surface of the first housing 210 facing the part b1 of the user's body while the electronic device 101 is worn by the user. The cover 240 may be penetrated by the first lens support 231 and the second lens support 232. For example, the cover 240 may include a plurality of holes 241 accommodating each of the first lens support 231 and the second lens support 232. For example, since the cover 240 covers the user's face while the electronic device 101 is worn by the user, it may be referred to as a face cover.

According to an embodiment of the disclosure, the first pad 250 may support the electronic device 101 while the electronic device 101 is worn by the user. The first pad 250 may maintain a position of the electronic device 101 with respect to the part b1 of the user's body while the electronic device 101 is worn by the user. The first pad 250 may be in contact with the user's forehead while the electronic device 101 is worn by the user. The first pad 250 may be coupled to the first housing 210. The first pad 250 may be disposed on the first housing 210. According to an embodiment of the disclosure, the first pad 250 may be movable with respect to the first housing 210. For example, the first pad 250 may be rotatable (or tiltable) with respect to the first housing 210. As the first pad 250 is movable with respect to the first housing 210, a posture (or angle) of the first pad 250 with respect to the first housing 210 may be adjusted (or changed). As the posture of the first pad 250 with respect to the first housing 210 is changed, the first pad 250 may be stably in contact with the user's forehead. For example, since the first pad 250 supports the user's forehead while the electronic device 101 is worn by the user, it may be referred to as a front pad (or front cushion).

According to an embodiment of the disclosure, the second pad 260 may support the electronic device 101 while the electronic device 101 is worn by the user. The second pad 260 may maintain the position of the electronic device 101 with respect to the part b1 of the user's body while the electronic device 101 is worn by the user. For example, the second pad 260 may be in contact with the user's back of head while the electronic device 101 is worn by the user. The second pad 260 may be coupled to the second housing 220. The second pad 260 may be disposed on the second housing 220. The second pad 260 may be disposed on a surface of the second housing 220 facing the part b1 of the user's body while the electronic device 101 is worn on the user. According to an embodiment of the disclosure, the second pad 260 may be movable with respect to the second housing 220. The second pad 260 may be rotatable (or tiltable) with respect to the second housing 220. As the second pad 260 is movable with respect to the second housing 220, a posture (or angle) of the second pad 260 with respect to the second housing 220 may be adjusted (or changed). As the posture of the second pad 260 with respect to the second housing 220 is changed, the second pad 260 may be stably in contact with the user's back of head. For example, since the second pad 260 supports the user's back of head while the electronic device 101 is worn by the user, it may be referred to as a back pad (or back cushion).

Figure 3A:
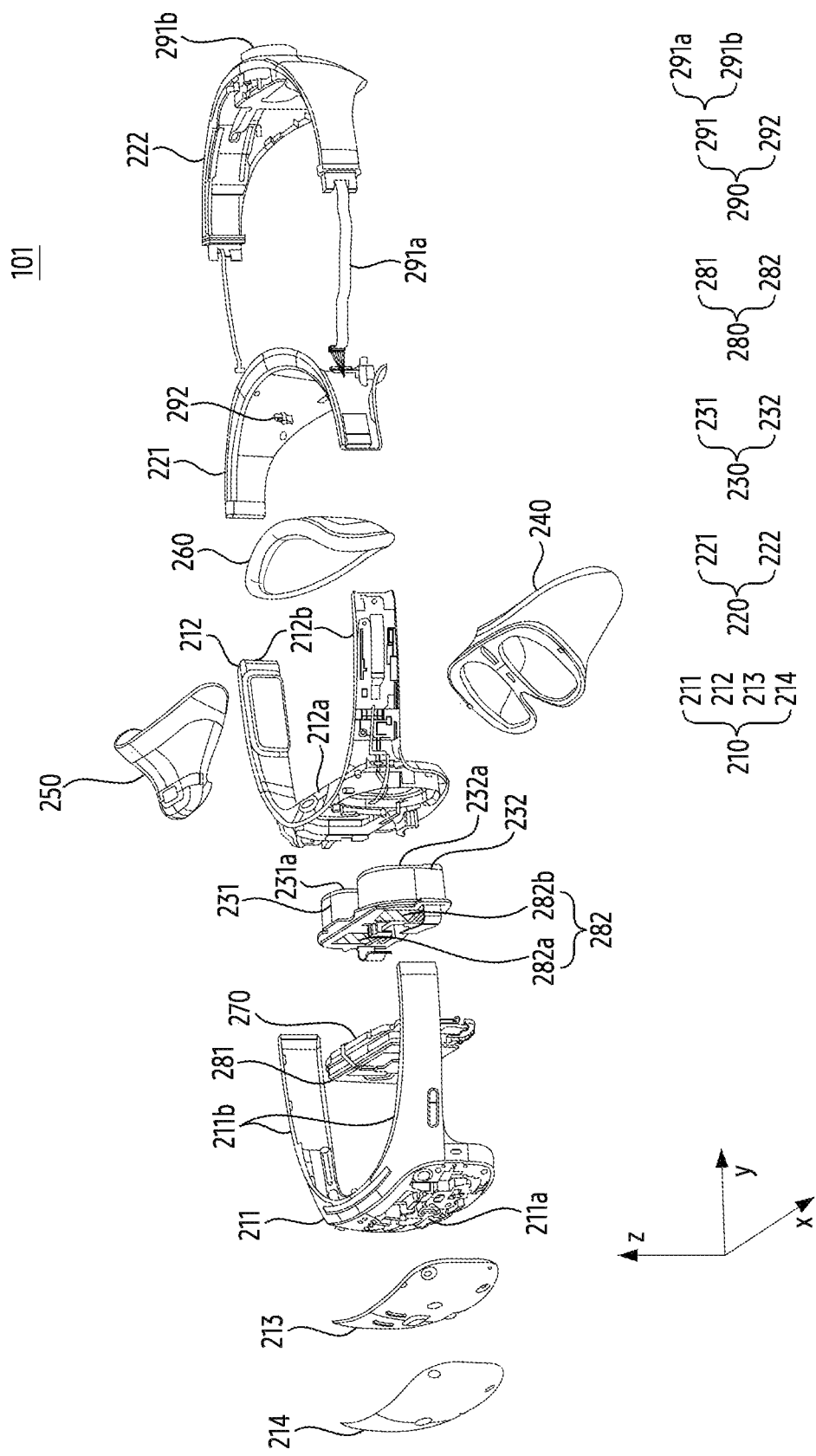
FIG. 3A is an exploded perspective view of an electronic device according to an embodiment of the disclosure.
Figure 3B:
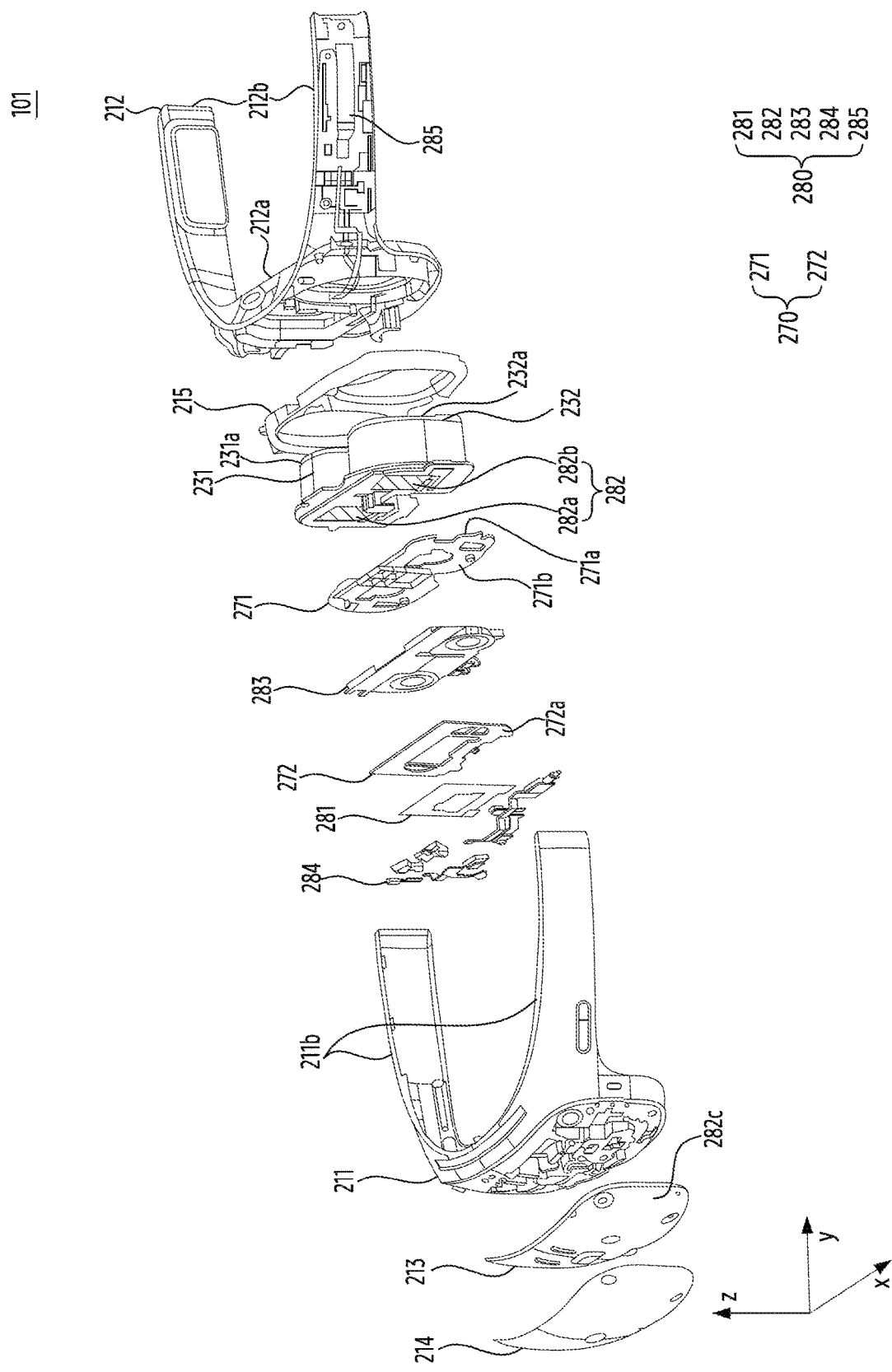
FIG. 3B is an exploded perspective view illustrating a relationship between components in a first housing of an electronic device according to an embodiment of the disclosure.

FIG. 3A is an exploded perspective view of an electronic device according to an embodiment of the disclosure. FIG. 3B is an exploded perspective view illustrating a relationship between components in a first housing of an electronic device according to an embodiment of the disclosure.

Referring to FIGS. 3A and 3B, according to an embodiment of the disclosure, an electronic device 101 may further include at least one bracket 270, an electronic component 280, and/or a plurality of adjustment modules 290.

According to an embodiment of the disclosure, the at least one bracket 270 may support components disposed within a first housing 210. The at least one bracket 270 may be disposed within the first housing 210. For example, the at least one bracket 270 may be surrounded by the first housing 210. According to an embodiment of the disclosure, the at least one bracket 270 may include a first bracket 271 and a second bracket 272.

According to an embodiment of the disclosure, the first bracket 271 may support a first lens support 231 and a second lens support 232. The first lens support 231 and the second lens support 232 may be movable with respect to the first bracket 271. For example, a surface 271a of the first bracket 271 may face the first lens support 231 and the second lens support 232. Another surface 271b of the first bracket 271 opposite to the surface 271a of the first bracket 271 may face the second bracket 272. For example, a direction (e.g., −y direction) in which the other surface 271b of the first bracket 271 faces may be opposite to a direction (e.g., +y direction) in which the surface 271a of the first bracket 271 faces.

According to an embodiment of the disclosure, the second bracket 272 may be fastened into the first housing 210. For example, the second bracket 272 may be fastened into the first housing 210 by being fastened to the first bracket 271, but is not limited thereto. The second bracket 272 may be spaced from the other surface 271b of the first bracket 271.

According to an embodiment of the disclosure, the electronic component 280 may implement various functions of the electronic device 101. For example, the electronic component 280 may include a printed circuit board 281, at least one display 282, at least one fan 283, at least one camera 284, and/or a speaker module 285. However, it is not limited thereto. For example, the electronic component 280 may include various electronic components in addition to the examples described above.

According to an embodiment of the disclosure, the printed circuit board 281 may form (or establish) an electrical connection between electronic components in the electronic device 101. The printed circuit board 281 may support at least a part of the electronic components in the electronic device 101. For example, the printed circuit board 281 may support a processor (e.g., the processor 120 of FIG. 1) of the electronic device 101. The processor 120 may be disposed on the printed circuit board 281. The printed circuit board 281 may be disposed in the first housing 210. The printed circuit board 281 may be disposed on the at least one bracket 270. For example, the printed circuit board 281 may be disposed on a surface 272a of the second bracket 272.

According to an embodiment of the disclosure, the at least one display 282 may be configured to provide visual content. The at least one display 282 may be disposed in the first housing 210. For example, the at least one display 282 may be disposed on the first bracket 271. For example, the at least one display 282 may face the surface 271a of the first bracket 271. According to an embodiment of the disclosure, the at least one display 282 may be movable with respect to the first housing 210. For example, the at least one display 282 may include a first display 282a coupled to the first lens support 231 and a second display 282b coupled to the second lens support 232. The first display 282a may be disposed on the first lens support 231. The first display 282a may emit light toward a first lens 231a. Light emitted from the first display 282a may be transmitted to a user by passing through the first lens 231a. The second display 282b may be disposed on the second lens support 232. The second display 282b may emit light toward a second lens 232a. Light emitted from the second display 282b may be transmitted to the user by passing through the second lens 232a. However, it is not limited thereto. For example, the at least one display 282 may include only one display disposed on the surface 271a of the first bracket 271.

According to an embodiment of the disclosure, the at least one fan 283 may generate airflow for discharging heat generated inside the electronic device 101 to the outside of the electronic device 101. For example, the at least one fan 283 may discharge (or transfer) heat generated from the at least one electronic component 280 to the outside of the first housing 210 by generating airflow. The at least one fan 283 may be disposed on the other surface 271b of the first bracket 271. For example, the at least one fan 283 may be coupled (or fastened) to the second bracket 272.

According to an embodiment of the disclosure, the at least one camera 284 may obtain an image based on receiving light from the outside of the electronic device 101. The at least one camera 284 may be disposed in the first housing 210. The at least one camera 284 may include a plurality of cameras facing different directions. The at least one camera 284 may include a gaze tracking camera that faces eye of a user, to track a gaze of the user wearing the electronic device 101. For example, the at least one camera 284 may include an external camera facing the outside of the electronic device 101 so that the electronic device 101 may provide virtual reality by obtaining an image from the outside. The external camera may obtain an image for identifying a gesture of the user of the electronic device 101 and/or an external reality image of the electronic device 101.

According to an embodiment of the disclosure, the speaker module 285 may be configured to provide audible content to the user of the electronic device 101. The speaker module 285 may be disposed in the first housing 210. A position of the speaker module 285 may correspond to the user's ear in a state that the electronic device 101 is worn on the user. For example, the position of the speaker module 285 may be aligned with the user's ear, in a state that the electronic device 101 is worn on the user.

According to an embodiment of the disclosure, the plurality of adjustment modules 290 may include a first adjustment module 291 and a second adjustment module 292.

According to an embodiment of the disclosure, the first adjustment module 291 may couple a second housing 220 and the first housing 210 so that the second housing 220 is movable with respect to the first housing 210. A distance between the second housing 220 and the first housing 210 may be adjusted (changed) by the first adjustment module 291. The first adjustment module 291 may include a band 291a and a first knob 291b. The band 219a may be disposed in the first housing 210 and the second housing 220. The band 291a may extend from the second housing 220 to the first housing 210. The band 291a may be operated through the first knob 291b exposed to the outside of the second housing 220. At least a part of the band 291a may be exposed to the outside of the electronic device 101 or covered by the first housing 210 and the second housing 220, by a movement of the second housing 220 with respect to the first housing 210. For example, as the user adjusts a distance between the first housing 210 and the second housing 220 to increase the distance through the knob 291b, at least a part of the band 291a may be exposed to the outside of the electronic device 101. For example, as the user adjusts the distance between the first housing 210 and the second housing 220 to decrease the distance through the knob 291b, the at least a part of the band 291a may be covered by the first housing 210 and the second housing 220.

According to an embodiment of the disclosure, the second adjustment module 292 may couple a second pad 260 to the second housing 220 so that the second pad 260 is movable with respect to the second housing 220. For example, at least a part of the second adjustment module 292 may be exposed to the outside of the second housing 220.

According to an embodiment of the disclosure, the first housing 210 may include a first case 211, a second case 212, a front panel 213, and/or a visor 214. The first case 211, the second case 212, the front panel 213, the visor 214, and a lens bracket 215 may be coupled to each other. The first case 211, the second case 212, the front panel 213, the visor 214, and the lens bracket 215 may form (or define) the first housing 210, by being coupled to each other.

According to an embodiment of the disclosure, the first case 211 may include a first support portion 211a and/or at least one band portion 211b.

According to an embodiment of the disclosure, the first support portion 211a may face the printed circuit board 281. The printed circuit board 281 may be disposed on (or within) the first support portion 211a. For example, the printed circuit board 281 may be disposed (or interposed) between the first support portion 211a and the at least one bracket 270. For example, the first pad 250 may be disposed on the first support portion 211a.

According to an embodiment of the disclosure, the at least one first band portion 211b may surround (or cover) a part of the user's body (e.g., a part of the user's body b1 of FIG. 2C), in a state that the electronic device 101 is worn on the user. The at least one first band portion 211b may have a shape extending from the first support portion 211a. The at least one first band portion 211b may extend in a direction away from the first support portion 211a. For example, the at least one first band portion 211b may include a plurality of first band portions spaced apart from each other, but is not limited thereto.

According to an embodiment of the disclosure, the second case 212 may include a second support portion 212a and/or at least one second band portion 212b.

According to an embodiment of the disclosure, the second support portion 212a may be coupled to the first support portion 211a. For example, a shape of the second support portion 212a may correspond to the shape of the first support portion 211a. The first support portion 211a and the second support portion 212a may be coupled with each other to provide a space in which components of the electronic device 101 may be arranged. For example, a part of each of the at least one bracket 270, the printed circuit board 281, the at least one fan 283, and the plurality of lens supports 230 may be disposed between the first support portion 211a and the second support portion 212a. The second support portion 212a may include a plurality of lens openings through which other parts of each of the plurality of lens supports 230 pass. The other parts of each of the plurality of lens supports 230 may be exposed to the outside of the first housing 210 by penetrating the plurality of lens openings. The second support portion 212a may support a first cover 240. For example, the first cover 240 may be disposed on the second support portion 212a.

According to an embodiment of the disclosure, the at least one second band portion 212b may be coupled to the at least one first band portion 211b. For example, a shape of the at least one second band portion 212b may correspond to the shape of the at least one first band portion 211b. For example, the at least one second band portion 212b may include a plurality of second band portions spaced apart from each other, but is not limited thereto. A part of the band 291a may be disposed in the at least one first band portion 211b and the at least one second band portion 212b. The part of the band 291a may be surrounded (or covered) by the at least one first band portion 211b and the at least one second band portion 212b. For example, the speaker module 285 may be disposed between the at least one first band portion 211b and the at least one second band portion 212b.

According to an embodiment of the disclosure, the front panel 213 may cover at least a part of components in the first housing 210 so that the components in the first housing 210 are not visible from the outside. The front panel 213 may be disposed on the first housing 210. For example, the front panel 213 may be disposed on the first support portion 211a of the first housing 210.

According to an embodiment of the disclosure, the visor 214 may be disposed on the first housing 210. The visor 214 may be disposed on the front panel 213. For example, at least a part of the visor 214 may be formed of a substantially transparent or substantially translucent material so that a camera (e.g., the camera module 180 of FIG. 1) of the electronic device 101 may receive light from the outside of the electronic device 101, but is not limited thereto.

According to an embodiment of the disclosure, the at least one display 282 may include a cover display 282c. The cover display 282c may be visible to a user other than the user of the electronic device 101. For example, the cover display 282c may display an image related to the user's facial expression obtained through the camera 284 so that a user other than the user of the electronic device 101 may see the user of the electronic device 101's facial expression. The cover display 282c may be disposed on the first housing 210. The cover display 282c may be exposed to the outside of the first housing 210. For example, the cover display 282c may be disposed between the front panel 213 and the visor 214. However, it is not limited thereto. For example, the cover display 282c may be surrounded (or covered) by the visor 214 by being inserted into the visor 214, or may be surrounded (or covered) by the front panel 213 by being inserted into the front panel 213. For example, the cover display 282c may be disposed between the front panel 213 and the first case 211.

According to an embodiment of the disclosure, the lens bracket 215 may be coupled to the second case 212 and the plurality of lens supports 230 so that the plurality of lens supports 230 may be stably disposed in the first housing 210. For example, the lens bracket 215 may be inserted into the second case 212. For example, the lens bracket 215 may cover (or surround) each of the plurality of lens supports 230.

According to an embodiment of the disclosure, the second housing 220 may include a third case 221 and/or a fourth case 222. The third case 221 and the fourth case 222 may be coupled to each other. The third case 221 and the fourth case 222 may be coupled to each other to form (or define) the second housing 220.

According to an embodiment of the disclosure, the third case 221 may face the second case 212. The third case 221 may support the second pad 260. The second pad 260 may be disposed on the third case 221. A part of the second adjustment module 292 may protrude (or be exposed) to the outside of the third case 221.

According to an embodiment of the disclosure, the fourth case 222 may be coupled to the third case 221. Another part of the band 291a may extend within the third case 221 and the fourth case 222. The knob 291b may protrude to the outside of the fourth case 222.

For example, in order to provide a realistic virtual reality to the user, a distance between the first lens support 231 and the second lens support 232 may be adjusted (or changed) to correspond to a distance between the user's pupils. Descriptions of a movement of the first lens support 231 and the second lens support 232 may be described through FIGS. 4A, 4B, and 4C.

Figure 4A:
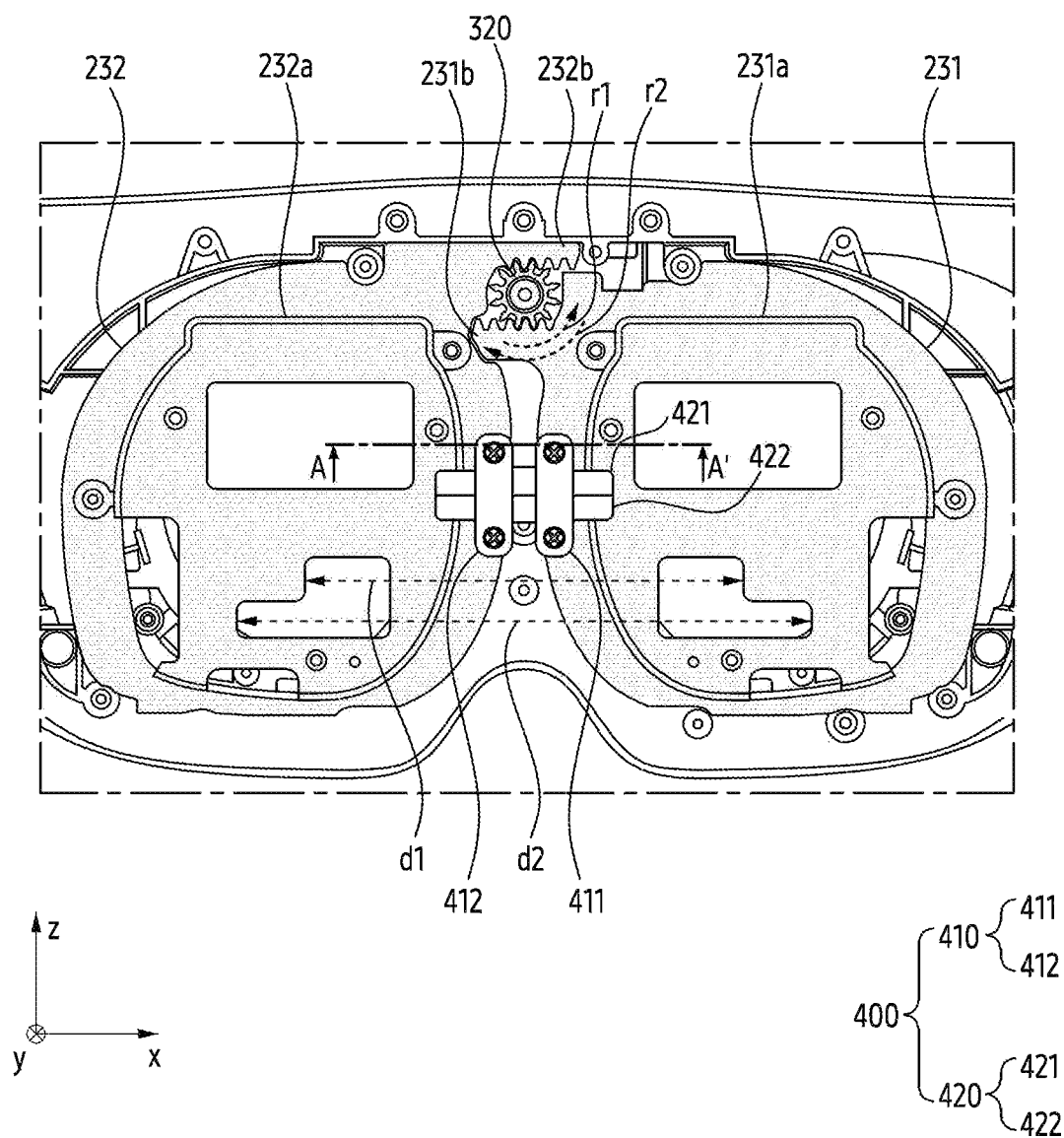
FIG. 4A is a top plan view of an electronic device according to an embodiment of the disclosure.
Figure 4B:
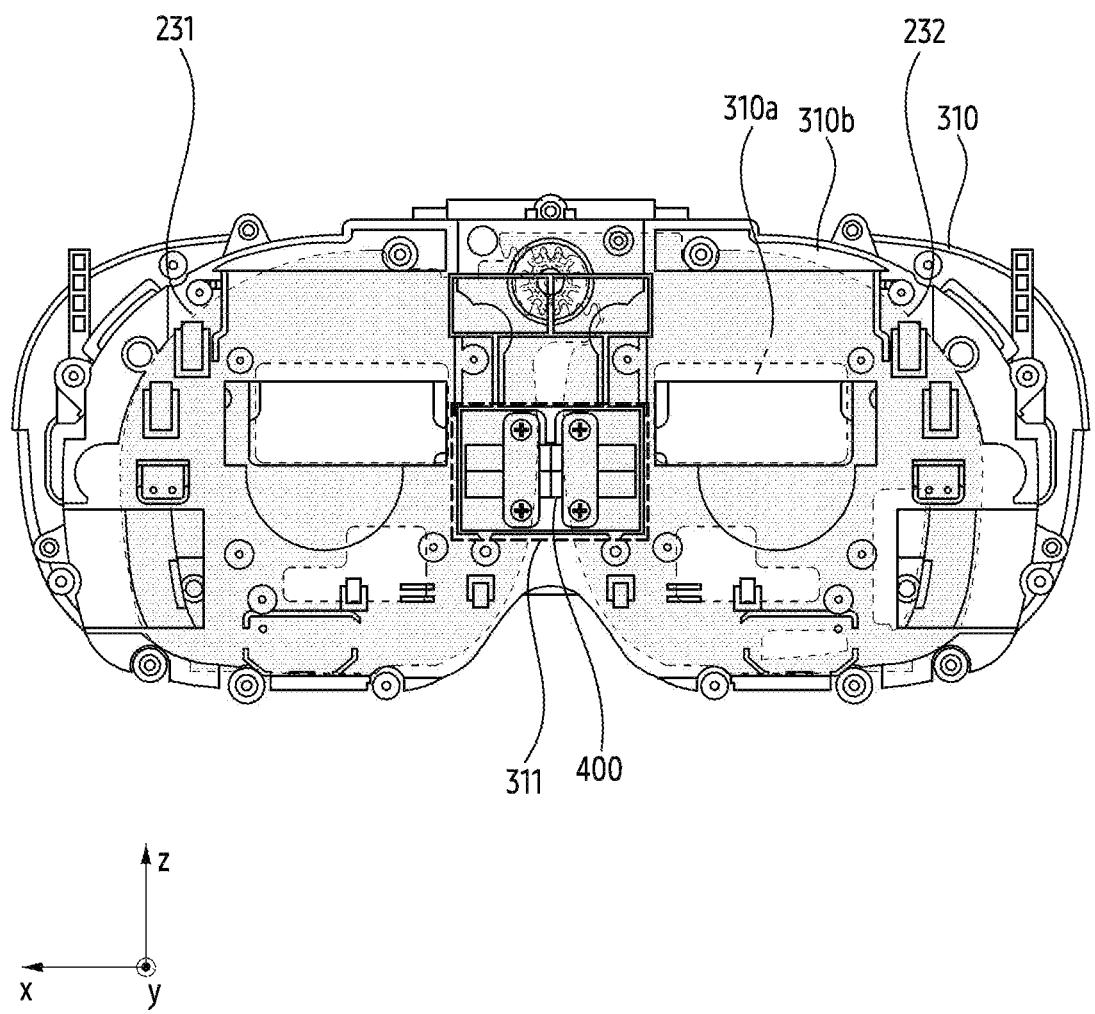
FIG. 4B is a bottom view of an electronic device according to an embodiment of the disclosure.
Figure 4C:
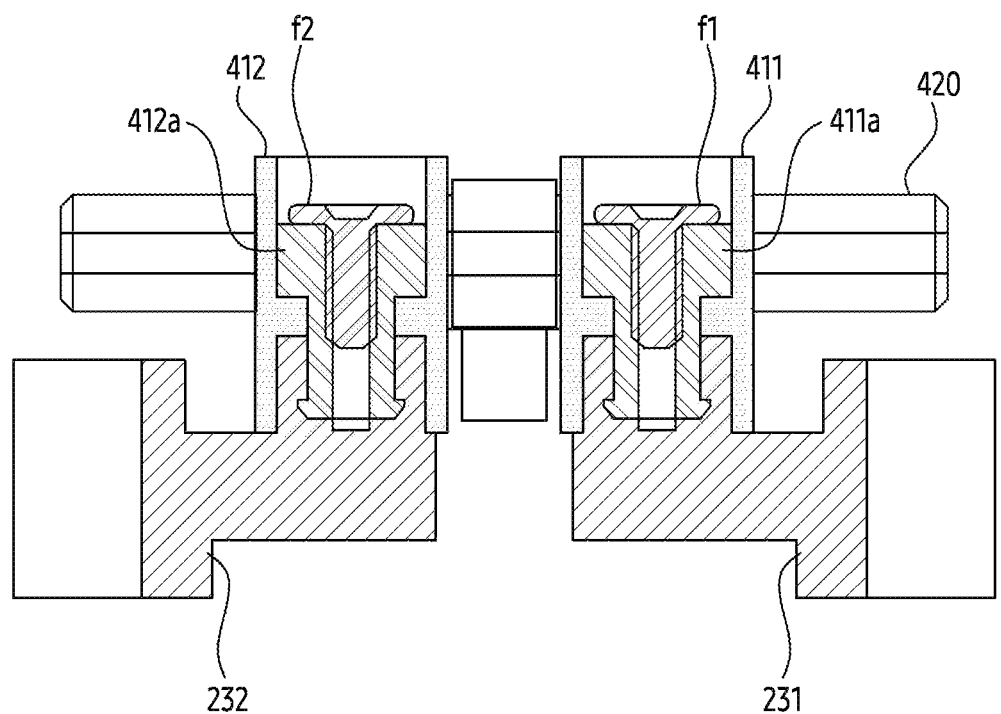
FIG. 4C is a cross-sectional view illustrating an example in which an electronic device is cut along line A-A' of FIG. 4A according to an embodiment of the disclosure.
Figure 4C:
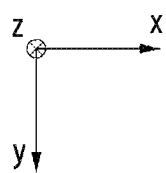

FIG. 4A is a top plan view of an electronic device according to an embodiment of the disclosure. FIG. 4B is a bottom view of an electronic device according to an embodiment of the disclosure. FIG. 4C is a cross-sectional view illustrating an example in which an electronic device is cut along line A-A' of FIG. 4A according to an embodiment of the disclosure.

Referring to FIGS. 4A, 4B, and 4C, an electronic device 101 according to an embodiment may include a first lens support 231, a second lens support 232, a first supporting member 310, a pinion gear 320, and a guide module 400.

According to an embodiment of the disclosure, the first lens support 231 may support a first lens 231a. The first lens support 231 may be coupled to the first lens 231a. The first lens 231a may move together with the first lens support 231 while the first lens support 231 moves, by being coupled to the first lens support 231. The first lens 231a may be exposed to the outside of the first supporting member 310. The first lens 231a may be disposed outside the first supporting member 310. The first lens support 231 may be movable with respect to the first supporting member 310. For example, the first lens support 231 may be movable with respect to the first support member 310, in a first direction (e.g., +x direction) away from the second lens support 232 or a second direction (e.g., −x direction) approaching the second lens support 232. According to an embodiment of the disclosure, the first lens support 231 may include a first rack gear 231b.

According to an embodiment of the disclosure, the first rack gear 231b may be coupled to the first lens support 231. For example, the first rack gear 231b may be integrally formed with the first lens support 231, but is not limited thereto. The first rack gear 231b may be formed separately from the first lens support 231b and then coupled to the first rack gear 231b. The first rack gear 231b may be engaged with the pinion gear 320. For example, the first rack gear 231b may include a plurality of gear teeth engaged with the pinion gear 320. The plurality of gear teeth of the first rack gear 231b may be arranged to be spaced apart from each other, in the first direction (e.g., +x direction) and/or the second direction (e.g., −x direction).

According to an embodiment of the disclosure, the second lens support 232 may support a second lens 232a. The second lens support 232 may be coupled to the second lens 232a. The second lens 232a may move together with the second lens support 232 while the second lens support 232 moves, by being coupled to the second lens support 232. The second lens 232a may be exposed to the outside of the first supporting member 310. The second lens 232a may be disposed outside the first supporting member 310. The second lens support 232 may be movable with respect to the first supporting member 310. For example, the second lens support 232 may be movable with respect to the first supporting member 310, in a second direction away from the first lens support 231 (e.g., −x direction) or a first direction (e.g., +x direction) approaching the first lens support 231. According to an embodiment of the disclosure, the second lens support 232 may include a second rack gear 232b.

According to an embodiment of the disclosure, the second rack gear 232b may be coupled to the second lens support 232. For example, the second rack gear 232b may be integrally formed with the second lens support 232, but is not limited thereto. The second rack gear 232b may be formed separately from the second lens support 232 and then coupled to the second rack gear 232b. The second rack gear 232b may be engaged with the pinion gear 320. For example, the second rack gear 232b may include a plurality of gear teeth engaged with the pinion gear 320. The plurality of gear teeth of the second rack gear 232b may be arranged to be spaced apart from each other, in the first direction (e.g., +x direction) and/or the second direction (e.g., −x direction). According to an embodiment of the disclosure, the second rack gear 232b may face the first rack gear 231b. The second rack gear 232b may be spaced apart from the first rack gear 231b while facing the first rack gear 231b. The second rack gear 232b may be spaced apart from the first rack gear 231b in a direction (e.g., +z direction) perpendicular to the first direction (e.g., +x direction).

According to an embodiment of the disclosure, the first supporting member 310 may accommodate a part of the first lens support 231 and a part of the second lens support 232. For example, the part of the first lens support 231 and the part of the second lens support 232 may be disposed inside the first supporting member 310. For example, the first supporting member 310 may be one of a first housing (e.g., the first housing 210 of FIGS. 2A, 2B, and 2C), and a first bracket (e.g., the first bracket 271 of FIG. 3B), but is not limited thereto. A surface 310a of the first supporting member 310 may face the first lens support 231 and the second lens support 232. For example, the first lens support 231 and the second lens support 232 may be movable with respect to the surface 310a of the first supporting member 310. For example, when the first supporting member 310 is referred to as the first bracket 271, the surface 310a of the first supporting member 310 may be substantially the same as a surface (e.g., the surface 271a of FIG. 3B) of the first bracket 271.

According to an embodiment of the disclosure, the pinion gear 320 may be engaged with the first rack gear 231b and the second rack gear 232b. For example, the pinion gear 320 may include a plurality of gear teeth engaged with the first rack gear 231b and the second rack gear 232b. The pinion gear 320 may be disposed on the first supporting member 310. For example, the pinion gear 320 may be coupled to the first supporting member 310. The pinion gear 320 may be rotatable with respect to the first supporting member 310 by movement of the first lens support 231 and the second lens support 232. For example, the pinion gear 320 may be rotatable with respect to the first supporting member 310, in a first rotation direction r1 and/or a second rotation direction r2. While the pinion gear 320 rotates, a distance between the first lens 231a and the second lens 232a may be changed. For example, while the pinion gear 320 rotates, the distance between the first lens 231a and the second lens 232a may be changed. The pinion gear 320 may be engaged with the first rack gear 231b and the second rack gear 232b to maintain the distance between the first lens 231a and the second lens 232a. For example, the pinion gear 320 may restrict movement of the first lens support 231 and the second lens support 232, by being engaged with the first rack gear 231b and the second rack gear 232b before external force is applied to the first lens support 231 and the second lens support 232.

For example, while the first lens support 231 moves in the first direction (e.g., the +x direction) away from the second lens support 232, the first rack gear 231b may move with respect to the second rack gear 232b along the first direction (e.g., +x direction). A distance between the first lens 231a and the second lens 232a may be changed from a first distance d1 to a second distance d2, by movement of the first rack gear 231b with respect to the second rack gear 232b in the first direction (e.g., +x direction). The first distance d1 may indicate a position of the first lens support 231 with respect to the second lens support 232. For example, the first distance d1 may be differently represented as a first position of the first lens support 231 with respect to the second lens support 232. For example, the first distance d1 may indicate a minimum distance between the first lens 231a and the second lens 232a, but is not limited thereto. The second distance d2 may indicate a position of the first lens support 231 with respect to the second lens support 232. For example, the second distance d2 may be differently represented as a second position of the first lens support 231 with respect to the second lens support 232. The second distance d2 may be different from the first distance d1. The second distance d2 may be greater than the first distance d1. For example, the second distance d2 may indicate a maximum distance between the first lens 231a and the second lens 232a, but is not limited thereto. For example, the second distance d2 may be smaller than the first distance d1. While the distance between the first lens 231a and the second lens 232a is changed from the first distance d1 to the second distance d2, the pinion gear 320 may rotate along the first rotation direction r1. For example, as the pinion gear 320 rotates along the first rotation direction r1, the distance between the first lens 231a and the second lens 232a may increase. For example, as the pinion gear 320 rotates along the first rotation direction r1, the first lens support 231 may move along the first direction (e.g., +x direction), and the second lens support 232 may move along the second direction (e.g., −x direction) opposite to the first direction (e.g., +x direction).

For example, while the first lens support 231 moves in the second direction (e.g., −x direction) approaching to the second lens support 232, the first rack gear 231b may move along the second direction (e.g., −x direction) with respect to the second rack gear 232b. The distance between the first lens 231a and the second lens 232a may be changed from the second distance d2 to the first distance d1, by movement of the first rack gear 231b with respect to the second rack gear 232b in the second direction (e.g., −x direction). While the distance between the first lens 231a and the second lens 232a is changed from the second distance d2 to the first distance d1, the pinion gear 320 may rotate along the second rotation direction r2 opposite to the first rotation direction r1. For example, as the pinion gear 320 rotates along the second rotation direction r2, the distance between the first lens 231a and the second lens 232a may decrease. For example, as the pinion gear 320 rotates along the second rotation direction r2, the first lens support 231 may move along the second direction (e.g., −x direction), and the second lens support 232 may move in the first direction (e.g., +x direction).

According to an embodiment of the disclosure, the guide module 400 may provide physical resistance to each of the first lens support 231 and the second lens support 232. Since the guide module 400 provides physical resistance, it may be referred to as a resistance module. The guide module 400 may provide friction force to each of the first lens support 231 and the second lens support 232 so that the user may stably change the distance between the first lens 231a and the second lens 232a. For example, when the guide module 400 is omitted, the distance between the first lens 231a and the second lens 232a may not be precisely adjusted by a force from the user. The electronic device 101 according to an embodiment may provide a structure in which the distance between the first lens 231a and the second lens 232a may be precisely adjusted by the user, by the guide module 400 that provides physical resistance to the first lens support 231 and the second lens support 232. According to an embodiment of the disclosure, the guide module 400 may be disposed (or accommodated) in a through hole 311 of the first supporting member 310 penetrating the first supporting member 310. For example, the through hole 311 of the first supporting member 310 may penetrate a surface 310a of the first supporting member 310 and another surface 310b of the first supporting member 310. For example, the through hole 311 may extend from the surface 310a of the first supporting member 310 to the other surface 310b of the first supporting member 310. The other surface 310b of the first supporting member 310 may be opposite to the surface 310a of the first supporting member 310. For example, a direction (e.g., −y direction) in which the other surface 310b of the first supporting member 310 faces may be opposite to a direction (e.g., +y direction) in which the surface 310a of the first supporting member 310 faces. According to an embodiment of the disclosure, the guide module 400 may include a plurality of moving members 410 and/or a plurality of friction members 420.

According to an embodiment of the disclosure, each of the plurality of moving members 410 may be coupled with each of the first lens support 231 and the second lens support 232. For example, the plurality of moving members 410 may include a first moving member 411 and a second moving member 412. For example, each of the plurality of moving members 410 may be referred to as a lens holder, a lens bracket, and/or a moving holder, but is not limited thereto.

According to an embodiment of the disclosure, the first moving member 411 may be coupled to the first lens support 231. The first moving member 411 may be movable together with the first lens support 231. For example, referring to FIG. 4C, the first moving member 411 may be fastened to the first lens support 231. For example, the first moving member 411 may be fastened to the first lens support 231 by at least one first fastening member f1 penetrating the first moving member 411 and the first lens support 231. According to an embodiment of the disclosure, the guide module 400 may include a first coupling member 411a. The first coupling member 411a may be used to couple the first moving member 411 and the first lens support 231. The first coupling member 411a may penetrate the first lens support 231 and the first moving member 411. For example, the first coupling member 411a may be formed separately from the first moving member 411 and then inserted into the first moving member 411 and the first lens support 231, but is not limited thereto. For example, the first coupling member 411a may be integrally formed with the first moving member 411. For example, the first coupling member 411a may be omitted from the guide module 400. For example, while the first lens support 231 moves with respect to the first supporting member 310, the first moving member 411 may be movable with respect to the first supporting member 310 together with the first lens support 231, by being fastened to the first lens support 231. For example, while the first lens support 231 moves with respect to the first supporting member 310 in the first direction (e.g., +x direction), the first moving member 411 may move with respect to the first supporting member 310 together with the first lens support 231 along the first direction (e.g., +x direction). For example, while the first lens support 231 moves with respect to the first supporting member 310 in the second direction (e.g., −x direction), the first moving member 411 may move with respect to the first supporting member 310 together with the first lens support 231 along the second direction (e.g., −x direction).

According to an embodiment of the disclosure, the second moving member 412 may be coupled to the second lens support 232. The second moving member 412 may be movable together with the second lens support 232. For example, referring to FIG. 4C, the second moving member 412 may be fastened to the second lens support 232. For example, the second moving member 412 may be fastened to the second lens support 232 by at least one second fastening member f2 penetrating the second moving member 412 and the second lens support 232. According to an embodiment of the disclosure, the guide module 400 may include a second coupling member 412a. The second coupling member 412a may be used to couple the second moving member 412 and the second lens support 232. The second coupling member 412a may penetrate the second lens support 232 and the second moving member 412. For example, the second coupling member 412a may be formed separately from the second moving member 412 and then inserted into the second moving member 412 and the second lens support 232, but is not limited thereto. For example, the second coupling member 412a may be integrally formed with the second moving member 412. For example, the second coupling member 412a may be omitted from the guide module 400. For example, while the second lens support 232 moves with respect to the first supporting member 310, the second moving member 412 may be movable with respect to the first supporting member 310 together with the second lens support 232 by being fastened to the second lens support 232. For example, while the second lens support 232 moves with respect to the first supporting member 310 along the first direction (e.g., +x direction), the second moving member 412 may move with respect to the first supporting member 310 together with the second lens support 232 along the first direction (e.g., +x direction). For example, while the second lens support 232 moves with respect to the first supporting member 310 along the second direction (e.g., −x direction), the second moving member 412 may move with respect to the first supporting member 310 together with the second lens support 232 along the second direction (e.g., −x direction).

According to an embodiment of the disclosure, each of the plurality of friction members 420 may be coupled to each of the plurality of moving members 410. For example, each of the plurality of friction members 420 may penetrate each of the plurality of moving members 410. For example, each of the plurality of friction members 420 may be inserted into each of the plurality of moving members 410. For example, each of the plurality of friction members 420 may be referred to as beam, bar, extension member, and/or penetration member, but is not limited thereto. According to an embodiment of the disclosure, the plurality of friction members 420 may include a first friction member 421 and/or a second friction member 422.

According to an embodiment of the disclosure, the first friction member 421 may penetrate the first moving member 411 and the second moving member 412. For example, the first friction member 421 may be inserted into the first moving member 411 and the second moving member 412. For example, while the first lens support 231 and the first moving member 411 are moving together, the first friction member 421 may provide friction force to the first moving member 411 and the second moving member 412, by being in contact with the first moving member 411 and the second moving member 412. For example, while the second lens support 232 and the second moving member 412 are moving together, the first friction member 421 may provide friction force to the first moving member 411 and the second moving member 412, by being in contact with the first moving member 411 and the second moving member 412. The friction force applied to the first moving member 411 and the second moving member 412 may provide physical resistance to the first lens support 231 and the second lens support 232. As physical resistance is provided to the first lens support 231 and the second lens support 232, the user may precisely change (or adjust) a distance between the first lens support 231 and the second lens support 232. For example, the first friction member 421 may include a material having the resistance of friction. For example, the first friction member 421 may be formed of a material having the resistance of friction. For example, the first friction member 421 may include polyoxymethylene resin, but is not limited thereto.

According to an embodiment of the disclosure, the second friction member 422 may penetrate the first moving member 411 and the second moving member 412. For example, the second friction member 422 may be inserted into the first moving member 411 and the second moving member 412. For example, while the first lens support 231 and the first moving member 411 are moving together, the second friction member 422 may provide friction force to the first moving member 411 and the second moving member 412 by being in contact with the first moving member 411 and the second moving member 412. For example, while the second lens support 232 and the second moving member 412 are moving together, the second friction member 422 may provide friction force to the first moving member 411 and the second moving member 412 by being in contact with the first moving member 411 and the second moving member 412. The friction force applied to the first moving member 411 and the second moving member 412 may provide physical resistance to the first lens support 231 and the second lens support 232. As physical resistance is provided to the first lens support 231 and the second lens support 232, the user may precisely change (or adjust) a distance between the first lens support 231 and the second lens support 232. For example, the second friction member 422 may include a material having the resistance of friction. For example, the second friction member 422 may be formed of a material having the resistance of friction. For example, the second friction member 422 may include polyoxymethylene resin, but is not limited thereto. The second fraction member 422 may be aligned with the first fraction member 421. For example, the second friction member 422 may be arranged with respect to the first friction member 421 in a direction (e.g., −z direction) away from the first friction member 421.

According to an embodiment of the disclosure, the first friction member 421 and the second friction member 422 may be movable along a direction away from each other. For example, while the first lens support 231 and the second lens support 232 are moving with respect to the first supporting member 310, each of the first friction member 421 and the second friction member 422 may be movable along a direction away from each other. For example, a structure in which the first friction member 421 and the second friction member 422 are movable may be described through FIGS. 5A, 5B, 5C, and/or 5D.

Figure 5A:
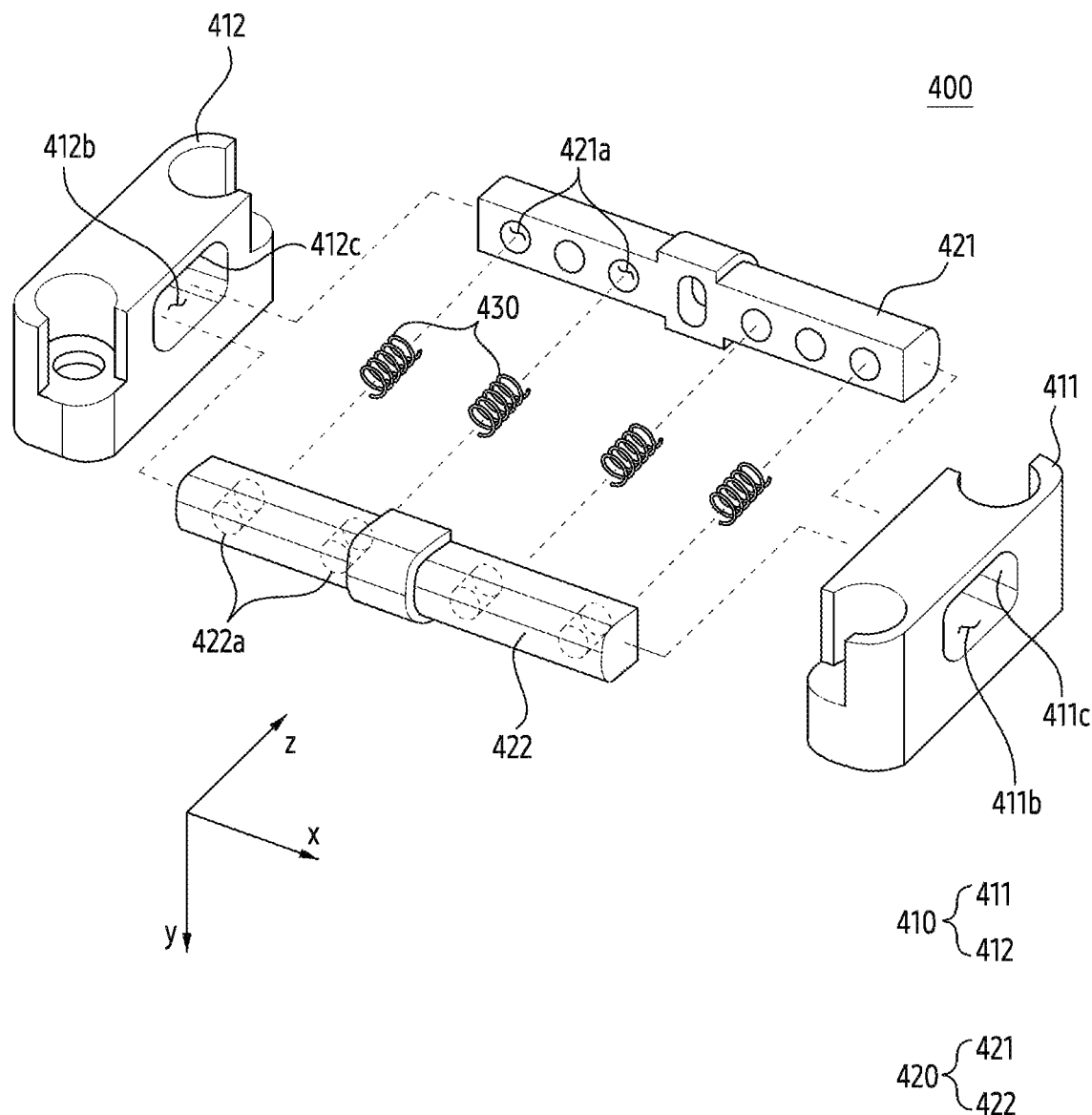
FIG. 5A is an exploded perspective view of a resistance module according to an embodiment of the disclosure.
Figure 5B:
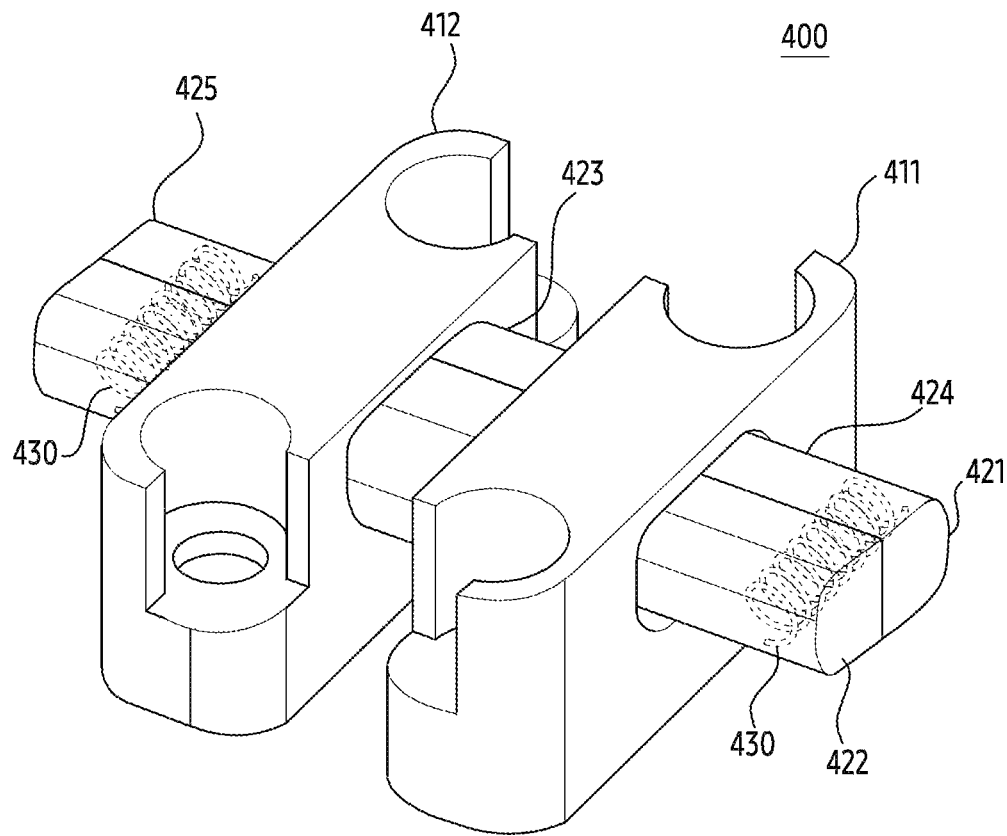
FIG. 5B is a perspective view illustrating a resistance module when a distance between a first lens and a second lens is a first distance according to an embodiment of the disclosure.
Figure 5C:
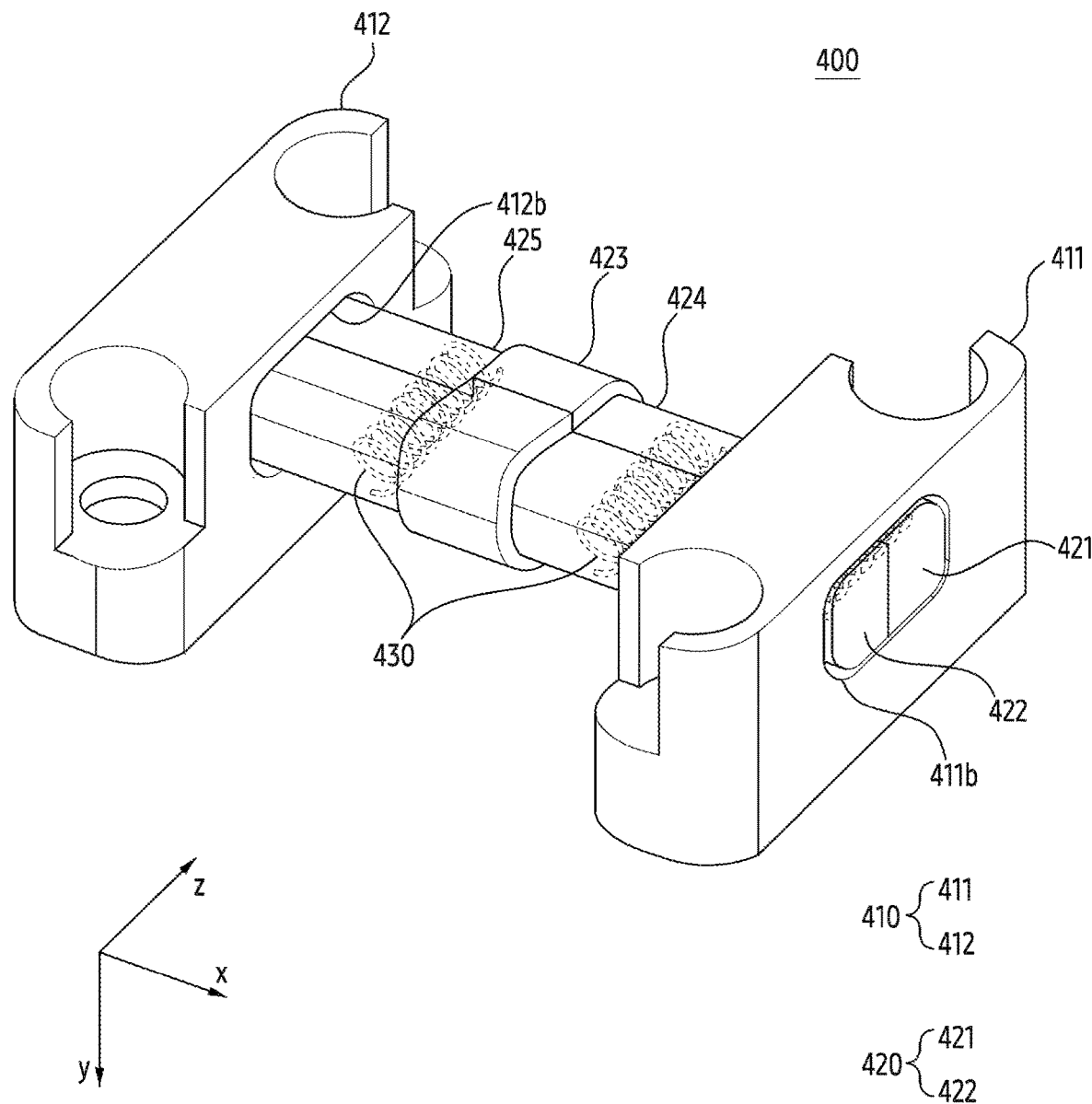
FIG. 5C is a perspective view illustrating a resistance module when a distance between a first lens and a second lens is a second distance according to an embodiment of the disclosure.
Figure 5D:
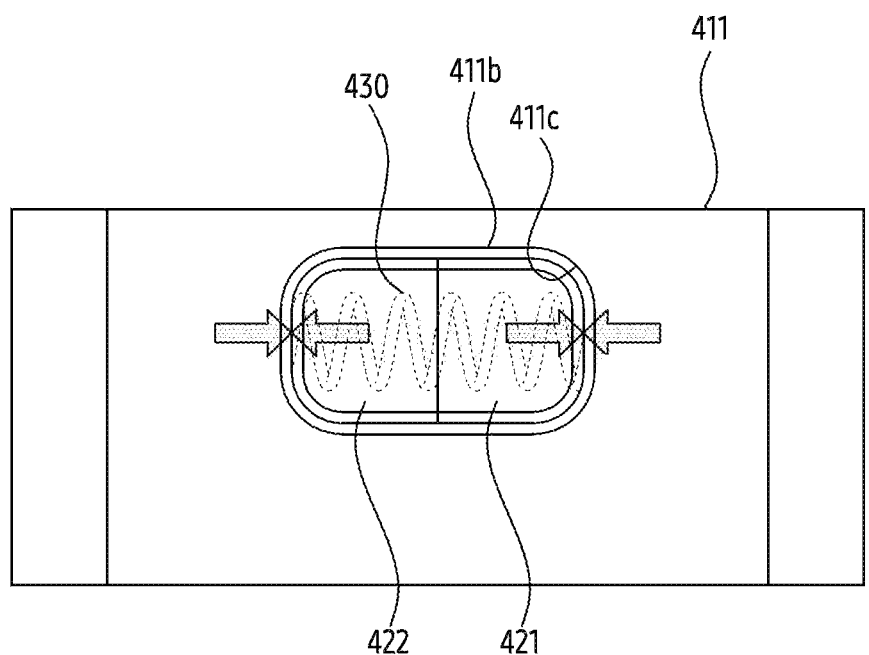
FIG. 5D is a side view of a resistance module according to an embodiment of the disclosure.
Figure 5D:
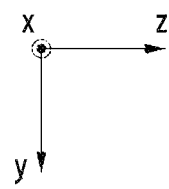

FIG. 5A is an exploded perspective view of a resistance module according to an embodiment of the disclosure. FIG. 5B is a perspective view illustrating a resistance module when a distance between a first lens and a second lens is a first distance according to an embodiment of the disclosure. FIG. 5C is a perspective view illustrating a resistance module when a distance between a first lens and a second lens is a second distance according to an embodiment of the disclosure. FIG. 5D is a side view of a resistance module according to an embodiment of the disclosure.

Referring to FIGS. 5A, 5B, 5C, and 5D, according to an embodiment of the disclosure, a guide module 400 may further include at least one deforming member 430.

According to an embodiment of the disclosure, at least one deforming member 430 may be deformable. For example, the at least one deforming member 430 may be formed of an elastically deformable material. For example, the at least one deforming member 430 may be referred to as at least one elastic member. For example, the at least one deforming member 430 may be a spring, but is not limited thereto. For example, the at least one deforming member 430 may include a coil spring, a leaf spring, rubber, and/or silicon. The at least one deforming member 430 may be disposed between a plurality of friction members 420. For example, the at least one deforming member 430 may be disposed in the plurality of friction members 420. For example, the at least one deforming member 430 may be covered (or surrounded) by the first friction member 421 and the second friction member 422. For example, the at least one deforming member 430 may include a plurality of deforming members spaced apart from each other along a first direction (e.g., +x direction), but is not limited thereto.

According to an embodiment of the disclosure, the first friction member 421 may include at least one first groove 421a, and the second friction member 422 may include at least one second groove 422a.

According to an embodiment of the disclosure, at least one first groove 421a may be formed in the first friction member 421. For example, the at least one first groove 421a may be formed as at least a portion of the first friction member 421 is recessed inward. The at least one first groove 421a may provide a space in which at least one deforming member 430 may be disposed (or accommodated). For example, a portion of the at least one deforming member 430 may be accommodated (or inserted or disposed) within the at least one first groove 421a. For example, when the at least one deforming member 430 includes a plurality of deforming members, the at least one first groove 421a may include a plurality of first grooves spaced apart from each other in a first direction (e.g., +x direction).

According to an embodiment of the disclosure, the at least one second groove 422a may be formed in the second friction member 422. For example, the at least one second groove 422a may be formed as at least a portion of the second friction member 422 is recessed inward. The at least one second groove 422a may provide a space in which at least one deforming member 430 may be disposed (or accommodated). For example, another portion of the at least one deforming member 430 may be accommodated (or inserted or disposed) within the at least one second groove 422a. For example, when the at least one deforming member 430 includes a plurality of deforming members, the at least one second groove 422a may include a plurality of second grooves spaced apart from each other in the first direction (e.g., +x direction). According to an embodiment of the disclosure, the at least one second groove 422a may be arranged with respect to the at least one first groove 421a. For example, the at least one second groove 422a may be aligned with the at least one first groove 421a to accommodate at least one deforming member 430.

According to an embodiment of the disclosure, at least one deforming member 430 may press each of the plurality of friction members 420 in a direction away from each other, by being disposed between the first friction member 421 and the second friction member 422. For example, as a portion of at least one deforming member 430 is accommodated in at least one first groove 421a and another portion of the at least one deforming member 430 is accommodated in at least one second groove 422a, the at least one deforming member 430 may press the first friction member 421 and the second friction member 422 in a direction away from each other, within the first fraction member 421 and the second fraction member 422. For example, while at least one of the first moving member 411 and the second moving member 412 is moving, the first friction member 421 may be movable independently of each of the first moving member 411 and the second moving member 412, by the at least one deforming member 430. For example, the at least one deforming member 430 may apply force in a third direction (e.g., +z direction) away from the second friction member 422 to the first friction member 421. The third direction (e.g., +z direction) may be substantially perpendicular to a moving direction (e.g., the first direction (e.g., the +x direction) and/or the second direction (−x direction)) of the first moving member 411 and/or the second moving member 412. The force in the third direction (e.g., the +z direction) transmitted to the first friction member 421 by at least one deforming member 430 may increase the magnitude of normal force applied between the first friction member 421 and the first moving member 411, and between the first friction member 421 and the second moving member 412. As the magnitude of normal force increases, the magnitude of friction force applied between the first friction member 421 and the first moving member 411 and between the first friction member 421 and the second moving member 412 may increase. For example, while at least one of the first moving member 411 and the second moving member 412 is moving, the second friction member 422 may be movable independently of each of the first moving member 411 and the second moving member 412, by at least one deforming member 430. For example, the at least one deforming member 430 may apply force in a fourth direction (e.g., −z direction) away from the first friction member 421 to the first friction member 421. The fourth direction (e.g., −z direction) may be substantially perpendicular to a moving direction (e.g., the first direction (e.g., the +x direction) and/or the second direction (−x direction)) of the first moving member 411 and/or the second moving member 412. The force in the fourth direction (e.g., −z direction) transmitted to the second friction member 422 by at least one deforming member 430 may increase the magnitude of normal force applied between the second friction member 422 and the first moving member 411 and between the second friction member 422 and the second moving member 412. As the magnitude of the normal force increases, the magnitude of the friction force applied between the second friction member 422 and the first moving member 411 and between the second friction member 422 and the second moving member 412 may increase. According to an embodiment of the disclosure, an electronic device (e.g., the electronic device 101 of FIGS. 4A and 4B) may provide a structure in which a distance between a first lens support (e.g., the first lens support 231 of FIG. 4A) and a second lens support (e.g., the second lens support 232 of FIG. 4A) may be precisely adjusted (or changed), by at least one deforming member 430 that provides friction force between the plurality of friction members 420 and the plurality of moving members 410.

According to an embodiment of the disclosure, the first moving member 411 may include a first opening 411b, and the second moving member 412 may include a second opening 412b.

According to an embodiment of the disclosure, the first opening 411b may accommodate each of a plurality of friction members 420. The first friction member 421 and the second friction member 422 may be inserted into the first opening 411b. The first opening 411b may penetrate the first moving member 411. The first friction member 421 and the second friction member 422 may be inserted into the first opening 411b to be in contact with a first inner surface 411c of the first moving member 411. The first inner surface 411c may surround (or cover) the first opening 411b.

According to an embodiment of the disclosure, the second opening 412b may accommodate each of a plurality of friction members 420. The first friction member 421 and the second friction member 422 may be inserted into the second opening 412b. The second opening 412b may penetrate the second moving member 412. The first friction member 421 and the second friction member 422 may be inserted into the second opening 412b to be in contact with a second inner surface 412c of the second moving member 412. The second inner surface 412c may surround (or cover) the second opening 412b.

According to an embodiment of the disclosure, a plurality of friction members 420 may include a first part 423, a second part 424, and/or a third part 425. The first part 423, the second part 424, and/or the third part 425 may indicate parts of the plurality of friction members 420 in a state in which the first friction member 421 and the second friction member 422 are coupled.

According to an embodiment of the disclosure, the first part 423 may restrict a movement range of each of the plurality of moving members 410. The first part 423 may be disposed between the second part 424 and the third part 425. For example, a cross-sectional area of the first part 423 may be greater than a cross-sectional area of the first opening 411b and a cross-sectional area of the second opening 412b. For example, the first part 423 may have a thickness greater than the second part 424 and the third part 425. For example, when a distance between the first lens support 231 and the second lens support 232 is a minimum distance (e.g., the first distance d1 of FIG. 4A), the first moving member 411 and the second moving member 412 may be in contact with the first part 423 of the plurality of moving members 410.

According to an embodiment of the disclosure, the second part 424 may be connected to the first part 423. For example, the second part 424 may be connected to an end of the first part 423. For example, the second part 424 may extend from the first part 423 along a first direction (e.g., +x direction). The second part 424 may be inserted into the first opening 411b. For example, a cross-sectional area of the second part 424 may correspond to a size of a cross-sectional area of the first opening 411b. For example, the cross-sectional area of the second part 424 may be smaller than a size of the cross-sectional area of the first part 423.

According to an embodiment of the disclosure, the third part 425 may be connected to the first part 423. For example, the third part 425 may be connected to another end of the first part 423. For example, the third part 425 may extend from the first part 423 along a second direction (e.g., −x direction). The third part 425 may be inserted into the second opening 412b. For example, a cross-sectional area of the third part 425 may correspond to a size of a cross-sectional area of the second opening 412b. For example, the cross-section area of the third part 425 may be smaller than a size of the cross-section area of the first part 423.

As described above, according to an embodiment of the disclosure, the electronic device 101 may provide a structure in which a distance between the first lens support 231 and the second lens support 232 may be precisely changed (or adjusted), by the guide module 400 for providing resistance to the first lens support 231 and the second lens support 232.

According to an embodiment of the disclosure, each of the plurality of friction members 420 may have a linearly extended shape. For example, each of the plurality of friction members 420 may have a shape substantially parallel to a moving direction of the first lens support 231 and/or the second lens support 232. For example, each of the plurality of friction members 420 may have a shape extending in a direction parallel to the first direction (e.g., +x direction) and/or the second direction (e.g., −x direction). However, it is not limited thereto. For example, an example in which a shape of each of the plurality of friction members 420 is changed may be described through FIG. 6.

Figure 6:
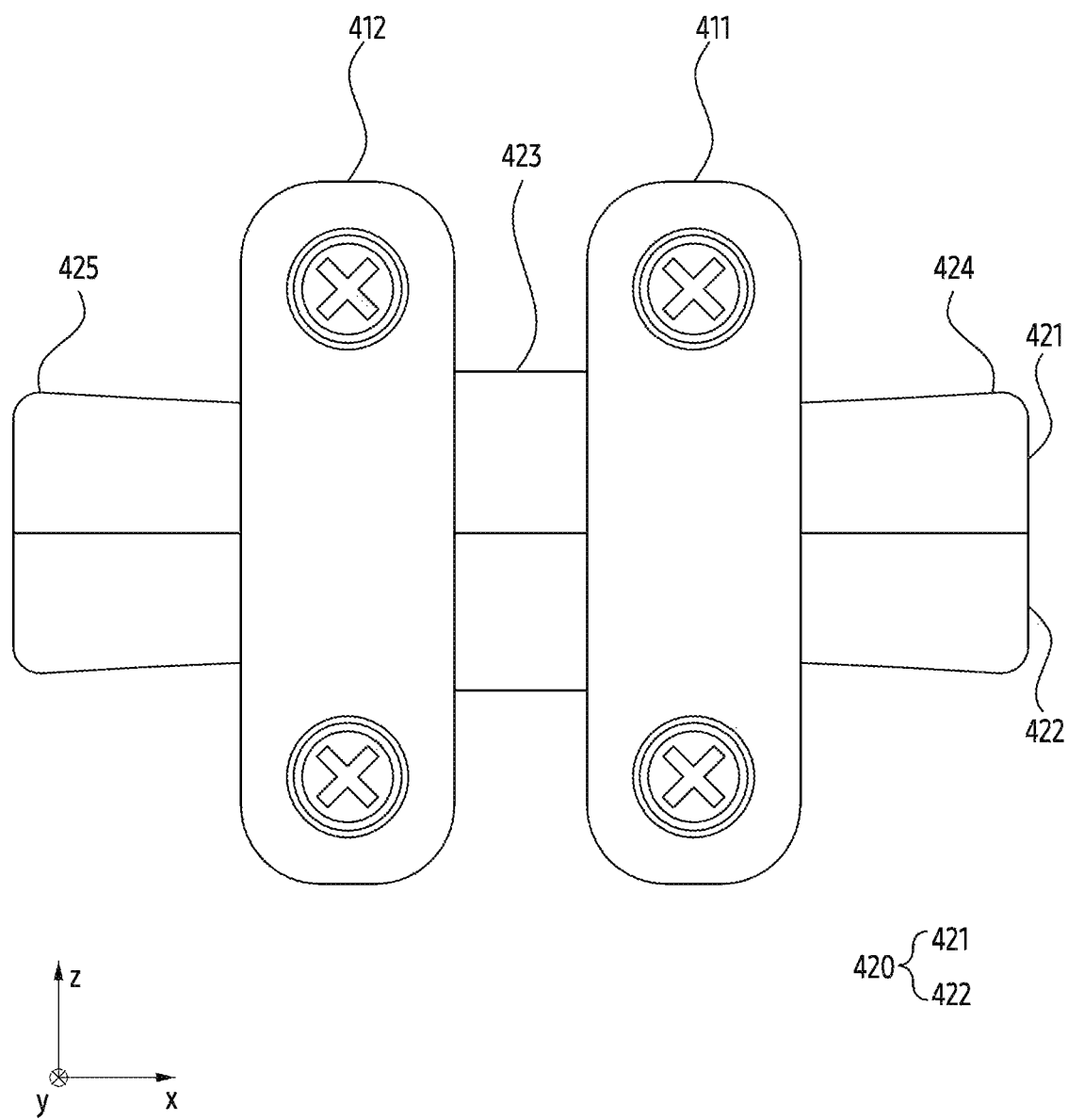
FIG. 6 is a top plan view of a resistance module according to an embodiment of the disclosure.

FIG. 6 is a top plan view of a resistance module according to an embodiment of the disclosure.

Referring to FIG. 6, according to an embodiment of the disclosure, each of a plurality of friction members 420 may have a bent shape. For example, at least one of a first friction member 421 and a second friction member 422 may have a shape bent to have a curvature. For example, at least one of the first friction member 421 and the second friction member 422 may have a shape bent to have a curvature with respect to a first direction (e.g., +x direction) and/or a second direction (e.g., −x direction). However, it is not limited thereto. For example, at least one of the first friction member 421 and the second friction member 422 may have a shape inclined with respect to the first direction (e.g., +x direction) and/or the second direction (e.g., −x direction). For example, a second part 424 and a third part 425 of the plurality of friction members 420 may have a shape inclined with respect to the first direction (e.g., +x direction) and/or the second direction (e.g., −x direction), which is a moving direction of a first moving member 411 and a second moving member 412. For example, a first part 423 of the plurality of friction members 420 may have a shape substantially parallel to the first direction (e.g., +x direction) and/or the second direction (e.g., −x direction), but is not limited thereto.

Figure 7A:
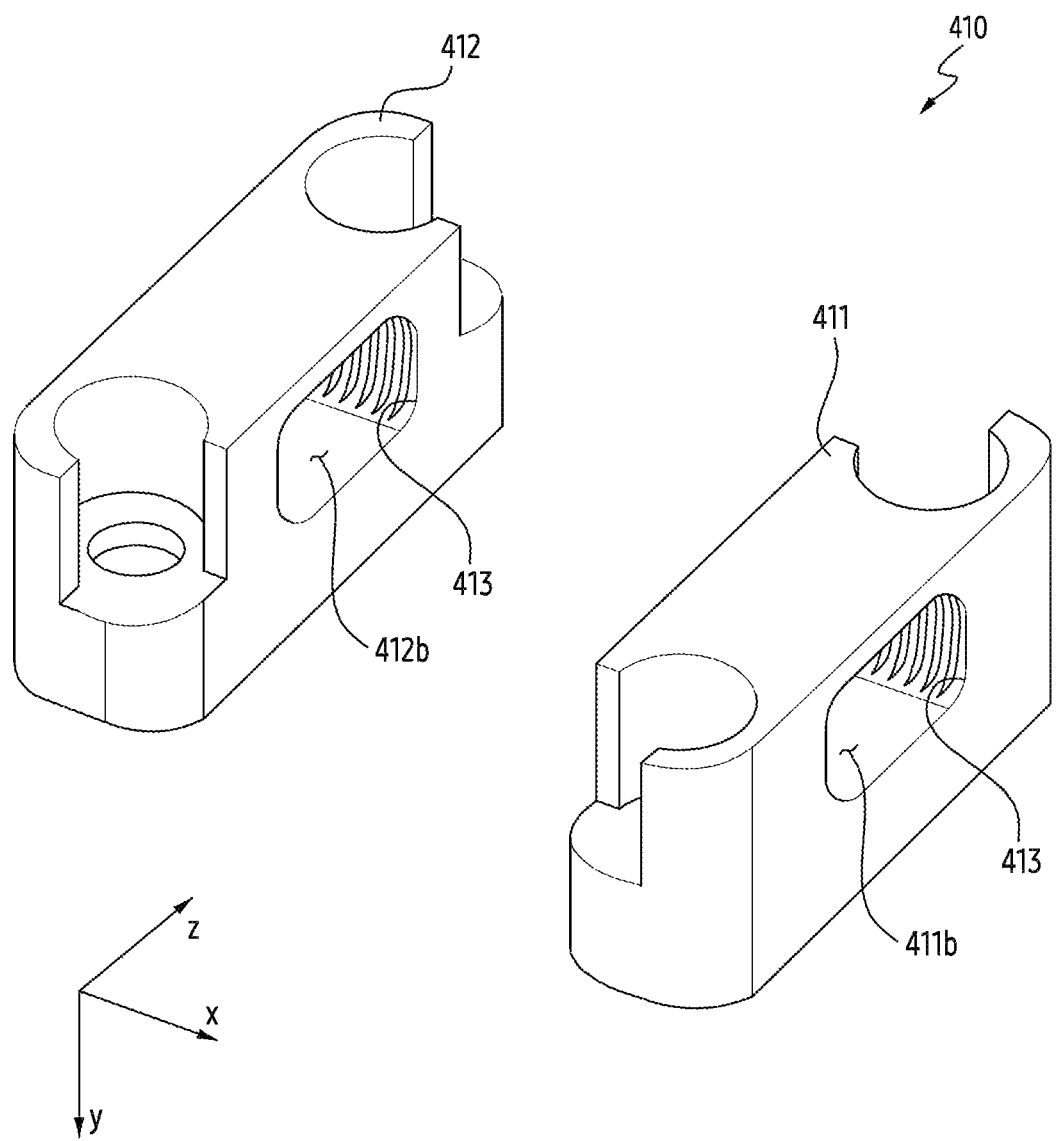
FIG. 7A is a perspective view illustrating a plurality of moving members according to an embodiment of the disclosure.
Figure 7B:
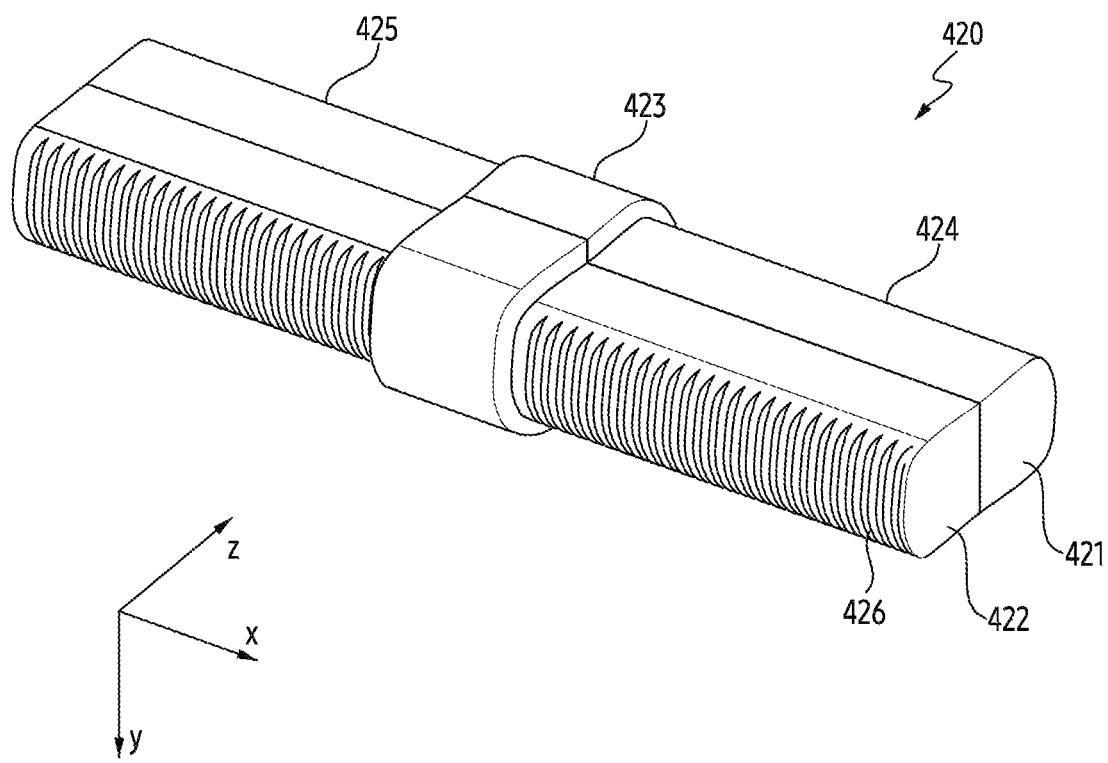
FIG. 7B is a perspective view illustrating a plurality of friction members according to an embodiment of the disclosure.
Figure 7C:
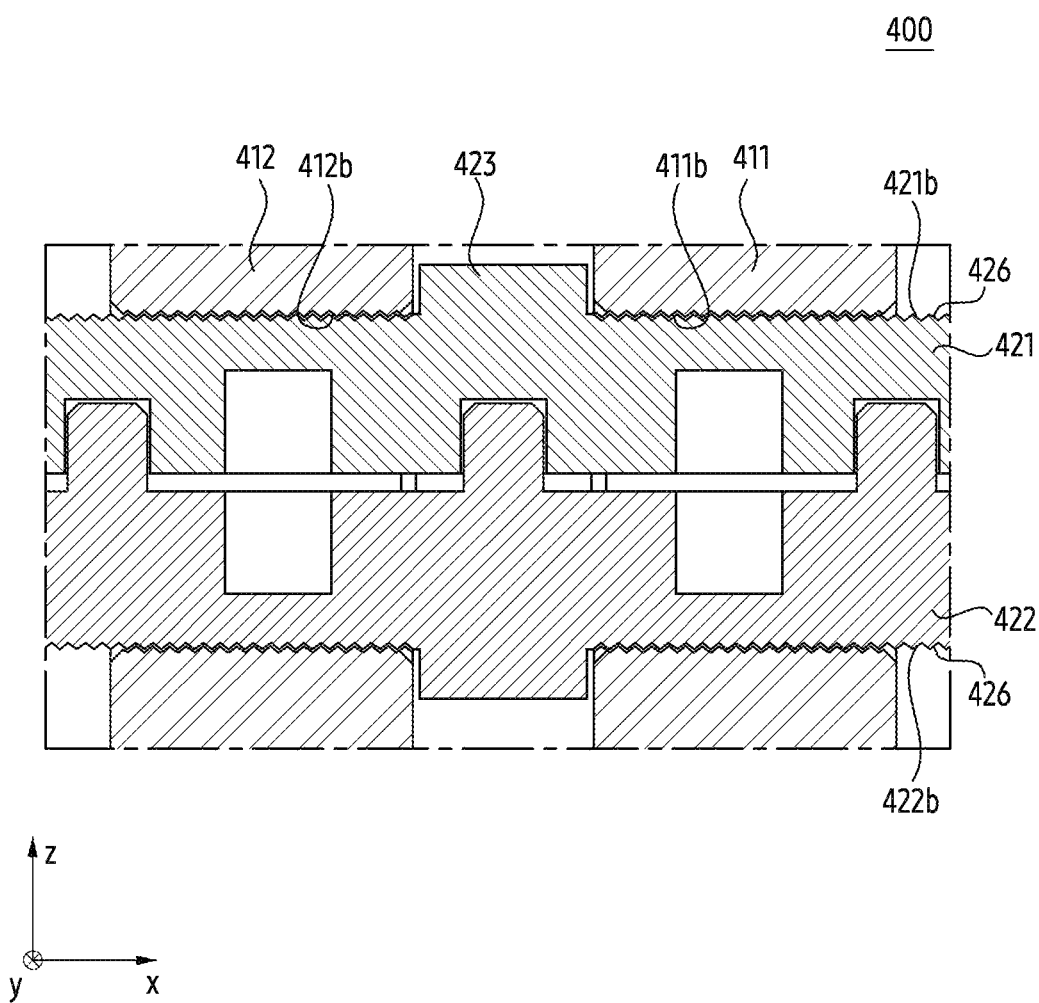
FIG. 7C is a cross-sectional view illustrating a state in which a plurality of moving members and a plurality of friction members are coupled according to an embodiment of the disclosure.

FIG. 7A is a perspective view illustrating a plurality of moving members according to an embodiment of the disclosure, FIG. 7B is a perspective view illustrating a plurality of friction members according to an embodiment of the disclosure. FIG. 7C is a cross-sectional view illustrating a state in which a plurality of moving members and a plurality of friction members are coupled according to an embodiment of the disclosure.

Referring to FIGS. 7A, 7B, and 7C, according to an embodiment of the disclosure, a plurality of moving members 410 may include a plurality of first irregularities 413. The plurality of first irregularities 413 may increase friction force between each of the plurality of moving members 410 and each of a plurality of friction members 420. For example, the plurality of first irregularities 413 may increase the friction force between each of the plurality of moving members 410 and each of the plurality of friction members 420 by increasing a contact area between each of the plurality of moving members 410 and each of the plurality of friction members 420. The plurality of first irregularities 413 may be disposed in at least one of a first moving member 411 and a second moving member 412. For example, the plurality of first irregularities 413 may be disposed in at least one of a first opening 411b and a second opening 412b. For example, the plurality of first irregularities 413 may be formed in at least one of the first opening 411b and the second opening 412b.

According to an embodiment of the disclosure, the plurality of friction members 420 may include a plurality of second irregularities 426. The plurality of second irregularities 426 may correspond to the plurality of first irregularities 413. The plurality of second irregularities 426 may be engaged with the plurality of first irregularities 413. The plurality of second irregularities 426 may be in contact with the plurality of first irregularities 413. For example, the plurality of second irregularities 426 may be arranged with respect to the plurality of first irregularities 413. As the plurality of second irregularities 426 and the plurality of first irregularities 413 are engaged with each other, a friction force between each of the plurality of moving members 410 and each of the plurality of friction members 420 may increase. For example, the plurality of second irregularities 426 may be formed in parts (e.g., the second part 424 and/or the third part 425) of the plurality of friction members 420 except for the first part 423 of the plurality of friction members 420. The plurality of second irregularities 426 may be formed in at least one of a first friction member 421 and a second friction member 422.

According to an embodiment of the disclosure, the plurality of second irregularities 426 may be formed in a first side surface 421b of the first fraction member 421. For example, the plurality of second irregularities 426 may be disposed along the first side surface 421b of the first fraction member 421. The first side surface 421b of the first friction member 421 may face a third direction (e.g., +z direction). At least a part of the first side surface 421b of the first friction member 421 may face the first opening 411b and the second opening 412b.

According to an embodiment of the disclosure, the plurality of second irregularities 426 may be formed in a second side surface 422b of the second friction member 422. For example, the plurality of second irregularities 426 may be disposed along the second side surface 422b of the second friction member 422. The second side surface 422b of the second friction member 422 may face a fourth direction (e.g., −z direction). At least a part of the second side surface 422b of the second friction member 422 may face the first opening 411b and the second opening 412b.

As described above, according to an embodiment of the disclosure, a guide module 400 may provide a structure in which a distance between a first lens support (e.g., the first lens support 231 of FIG. 4A) and a second lens support (e.g., the second lens support 232 of FIG. 4A) may be precisely adjusted, by the plurality of first irregularities 413 and the plurality of second irregularities 426 for increasing friction force between the plurality of moving members 410 and the plurality of friction members 420.

Figure 8:
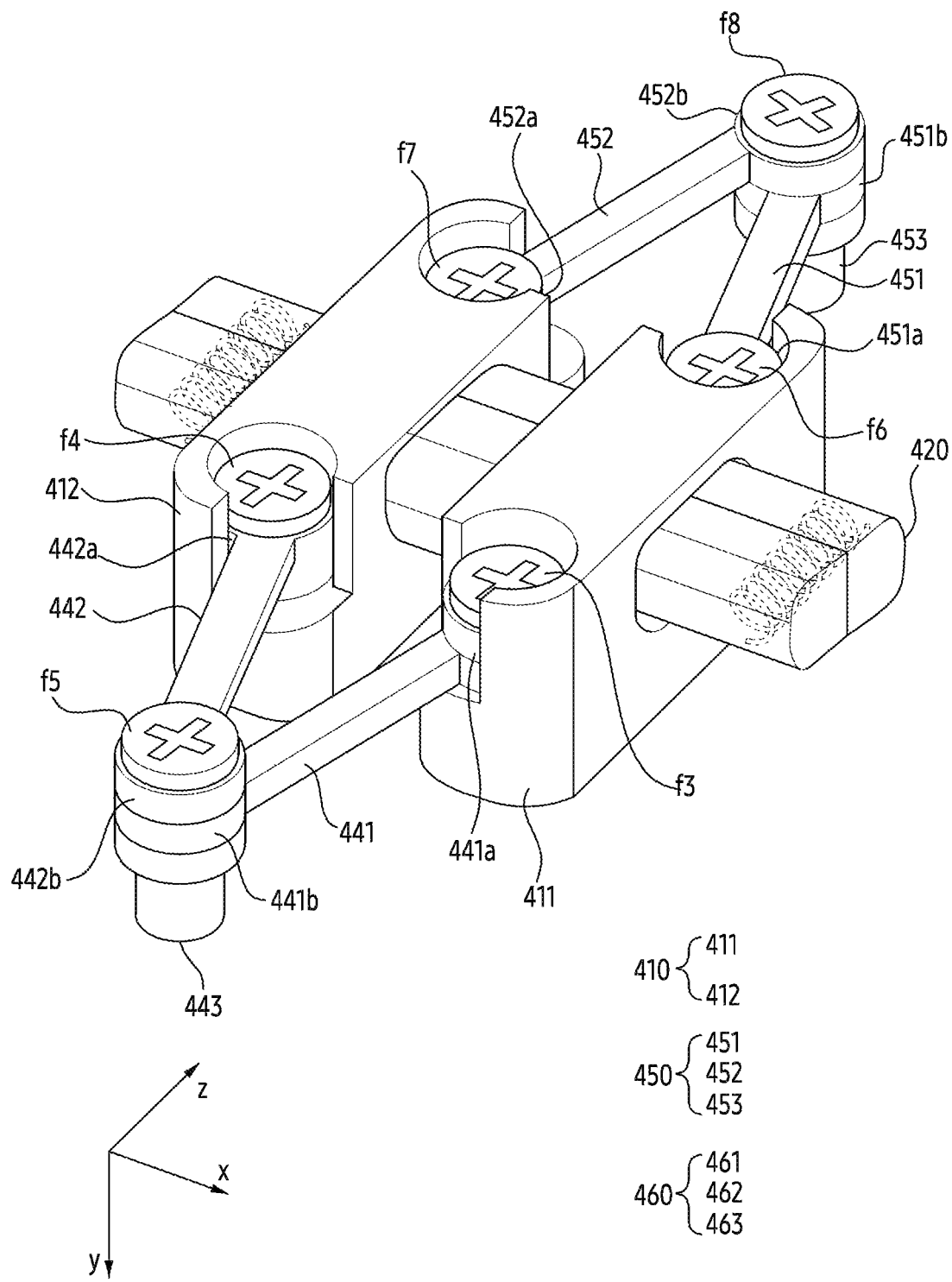
FIG. 8 is a perspective view of a resistance module according to an embodiment of the disclosure.

FIG. 8 is a perspective view of a resistance module according to an embodiment of the disclosure.

Since a guide module 400 of FIG. 8 may be a guide module 400 added to a first link structure 440 and a second link structure 450 from the guide module 400 of FIG. 4A, redundant descriptions will be omitted.

Referring to FIG. 8, the guide module 400 according to an embodiment may include the first link structure 440 and the second link structure 450. Each of the first link structure 440 and the second link structure 450 may link movements of the first moving member 411 and the second moving member 412. For example, by the first link structure 440, a moving distance of a first moving member 411 and a second moving member 412 with respect to a plurality of friction members 420 may be the same. For example, by the second link structure 450, the moving distance of the first moving member 411 and the second moving member 412 with respect to the plurality of friction members 420 may be the same.

According to an embodiment of the disclosure, the first link structure 440 may include a first connecting member 441, a second connecting member 442, and/or a first pin 443.

According to an embodiment of the disclosure, the first connecting member 441 may be coupled to the first moving member 411 and the first pin 443. For example, an end 441a of the first connecting member 441 may be coupled to the first moving member 411. For example, the end 441a of the first connecting member 441 may be fastened to the first moving member 411 by a third fastening member f3 penetrating the end 441a of the first connecting member 441 and the first moving member 411. For example, another end 441b of the first connecting member 441 opposite to the end 441a of the first connecting member 441 may be coupled to the first pin 443. While the first moving member 411 moves with respect to the plurality of friction members 420, the first connecting member 441 may be rotatable with respect to the first moving member 411 and the first pin 443. The first connecting member 441 may be rotatable based on the first pin 443 by movement of the first moving member 411.

According to an embodiment of the disclosure, the second connecting member 442 may be coupled to the second moving member 412 and the first pin 443. For example, an end 442a of the second connecting member 442 may be coupled to the second moving member 412. For example, the end 442a of the second connecting member 442 may be fastened to the second moving member 412 by a fourth fastening member f4 penetrating the end 442a of the second connecting member 442 and the second moving member 412. The second connecting member 442 may be rotatable based on the first pin 443, by movement of the second moving member 412. For example, the second connecting member 442 may be rotatable with respect to the first pin 443 while the second moving member 412 is moving. For example, another end 442b of the second connecting member 442 opposite to the end 442a of the second connecting member 442 may be coupled to the first pin 443. The second connecting member 442 may be disposed (or laminated) on the first connecting member 441. The second connecting member 442 may be rotatable with respect to the second moving member 412 and the first pin 443 while the second moving member 412 moves with respect to the plurality of friction members 420. The second connecting member 442 may be rotatable based on the first pin 443, by the movement of the second moving member 412.

According to an embodiment of the disclosure, the first pin 443 may be coupled to the first connecting member 441 and the second connecting member 442. The first pin 443 may provide (or form) a rotation axis of the first connecting member 441 and the second connecting member 442. The first pin 443 may penetrate the first connecting member 441 and the second connecting member 442. For example, the first pin 443 may penetrate the other end 441b of the first connecting member 441 and the other end 442b of the second connecting member 442. For example, the first pin 443 may be inserted into the other end 441b of the first connecting member 441 and the other end 442b of the second connecting member 442. For example, a fifth fastening member f5 may maintain the coupling between the first connecting member 441, the second connecting member 442, and the first pin 443, by penetrating the first pin 443.

According to an embodiment of the disclosure, the second link structure 450 may include a third connecting member 451, a fourth connecting member 452, and/or a second pin 453.

According to an embodiment of the disclosure, the third connecting member 451 may be coupled to the first moving member 411 and the second pin 453. For example, an end 451a of the third connecting member 451 may be coupled to the first moving member 411. For example, the end 451a of the third connecting member 451 may be fastened to the first moving member 411 by a sixth fastening member f6 penetrating the end 451a of the third connecting member 451 and the first moving member 411. The third connecting member 451 may be rotatable based on the second pin 453 by the movement of the first moving member 411. For example, the third connecting member 451 may be rotatable with respect to the second pin 453 while the first moving member 411 is moving. For example, another end 451b of the third connecting member 451 opposite to the end 451a of the third connecting member 451 may be coupled to the second pin 453. The third connecting member 451 may be rotatable with respect to the first moving member 411 and the second pin 453 while the first moving member 411 moves with respect to the plurality of friction members 420.

The third connecting member 451 may be rotatable based on the second pin 453 by the movement of the first moving member 411.

According to an embodiment of the disclosure, the fourth connecting member 452 may be coupled to the second moving member 412 and the second pin 453. For example, an end 452a of the fourth connecting member 452 may be coupled to the second moving member 412. For example, the end 452a of the fourth connecting member 452 may be fastened to the second moving member 412 by a seventh fastening member f7 penetrating the fourth connecting member 452 and the second moving member 412. The fourth connecting member 452 may be rotatable based on the second pin 453 by movement of the second moving member 412. For example, the fourth connecting member 452 may be rotatable with respect to the second pin 453 while the second moving member 412 is moving. For example, another end 452b of the fourth connecting member 452 opposite to the end 452a of the fourth connecting member 452 may be coupled to the second pin 453. The fourth connecting member 452 may be disposed (or laminated) on the third connecting member 451. The fourth connecting member 452 may be rotatable with respect to the second moving member 412 and the second pin 453 while the second moving member 412 moves with respect to the plurality of friction members 420. The fourth connecting member 452 may be rotatable based on the second pin 453 by the movement of the second moving member 412.

According to an embodiment of the disclosure, the second pin 453 may be coupled to the third connecting member 451 and the fourth connecting member 452. The second pin 453 may provide (or form) a rotation axis of the third connecting member 451 and the fourth connecting member 452. The second pin 453 may penetrate the third connecting member 451 and the fourth connecting member 452. For example, the second pin 453 may penetrate the other end 451b of the third connecting member 451 and the other end 452b of the fourth connecting member 452. For example, the second pin 453 may be inserted into the other end 451b of the third connecting member 451 and the other end 452b of the fourth connecting member 452. For example, an eighth fastening member f8 may maintain the coupling between the third connecting member 451, the fourth connecting member 452, and the second pin 453, by penetrating the second pin 453.

According to an embodiment of the disclosure, the first link structure 440 and the second link structure 450 may be symmetrical based on the plurality of friction members 420. For example, the first link structure 440 and the second link structure 450 may be symmetrically disposed (or arranged) based on the plurality of friction members 420. For example, the plurality of friction members 420 may be disposed between the first link structure 440 and the second link structure 450. For example, the plurality of moving members 410 may be disposed between the first link structure 440 and the second link structure 450. For example, the plurality of friction members 420 may be disposed between the first pin 443 and the second pin 453.

According to an embodiment of the disclosure, the first pin 443 may be movable while the first connecting member 441 and the second connecting member 442 rotate with respect to the first pin 443. The second pin 453 may be movable while the third connecting member 451 and the fourth connecting member 452 rotate with respect to the second pin 453. The movement of the first fin 443 and the second fin 453 may be described through FIGS. 9A, 9B, 9C, and 9D.

Meanwhile, hereinafter, the first pin 443 and the second pin 453 will be described as being movable, but the embodiments are not limited thereto. For example, a position of each of the first pin 443 and the second pin 453 may be maintained (or fixed) while at least one of the first moving member 411 and the second moving member 412 moves.

Figure 9A:
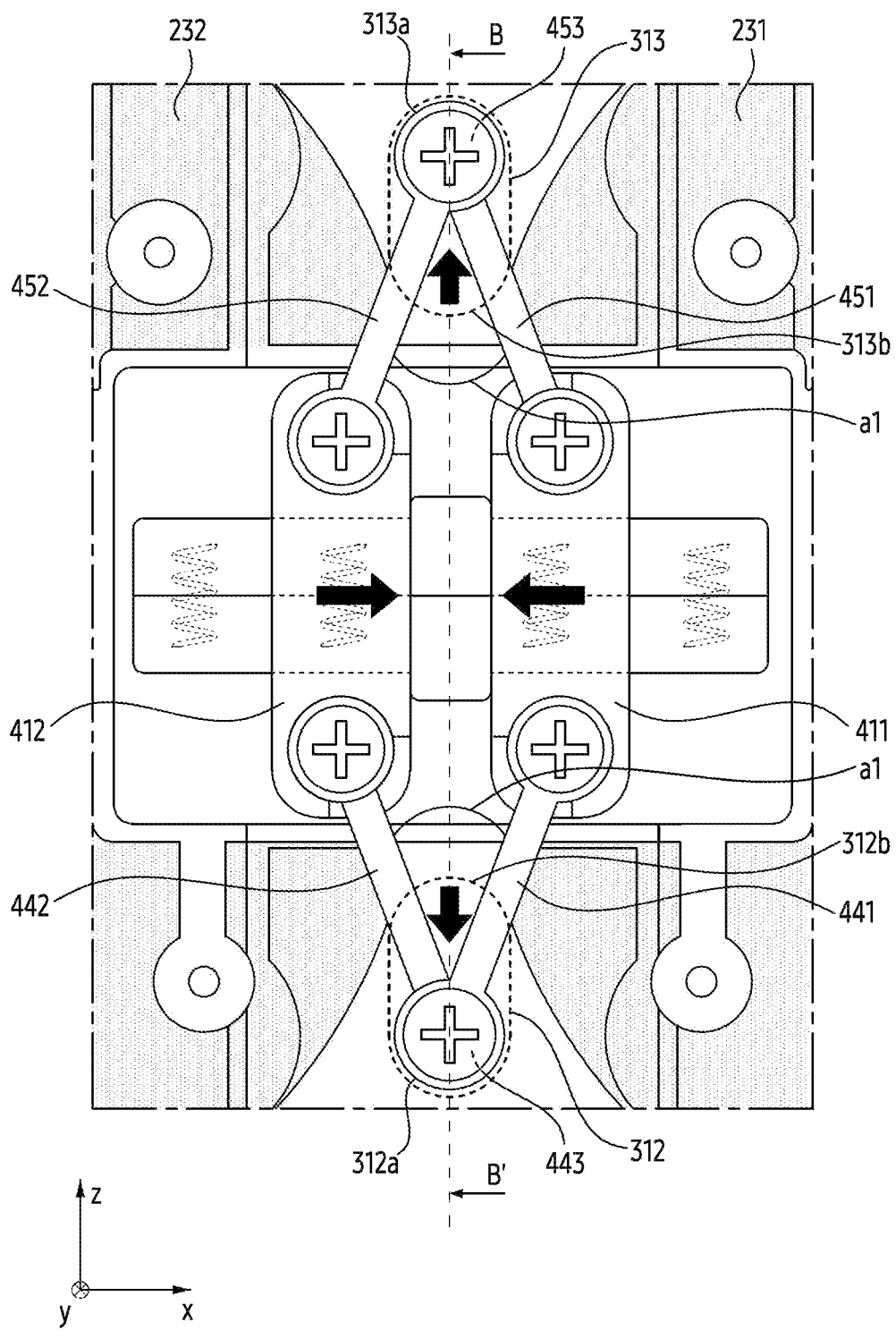
FIG. 9A is a top plan view of a resistance module when a distance between a first lens and a second lens is a first distance according to an embodiment of the disclosure.
Figure 9B:
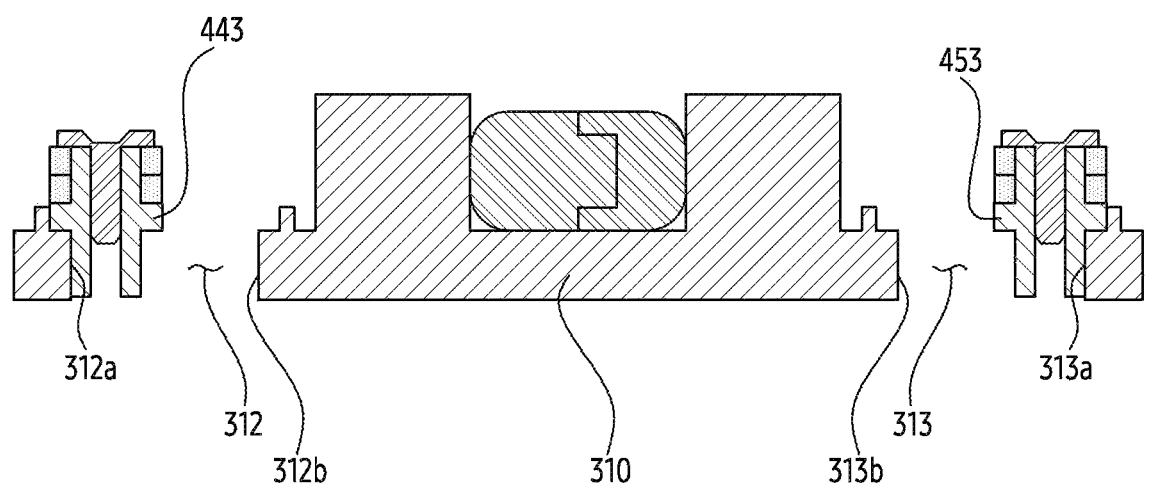
FIG. 9B is a cross-sectional view illustrating an example in which a resistance module is cut along line B-B' of FIG. 9A according to an embodiment of the disclosure.
Figure 9C:
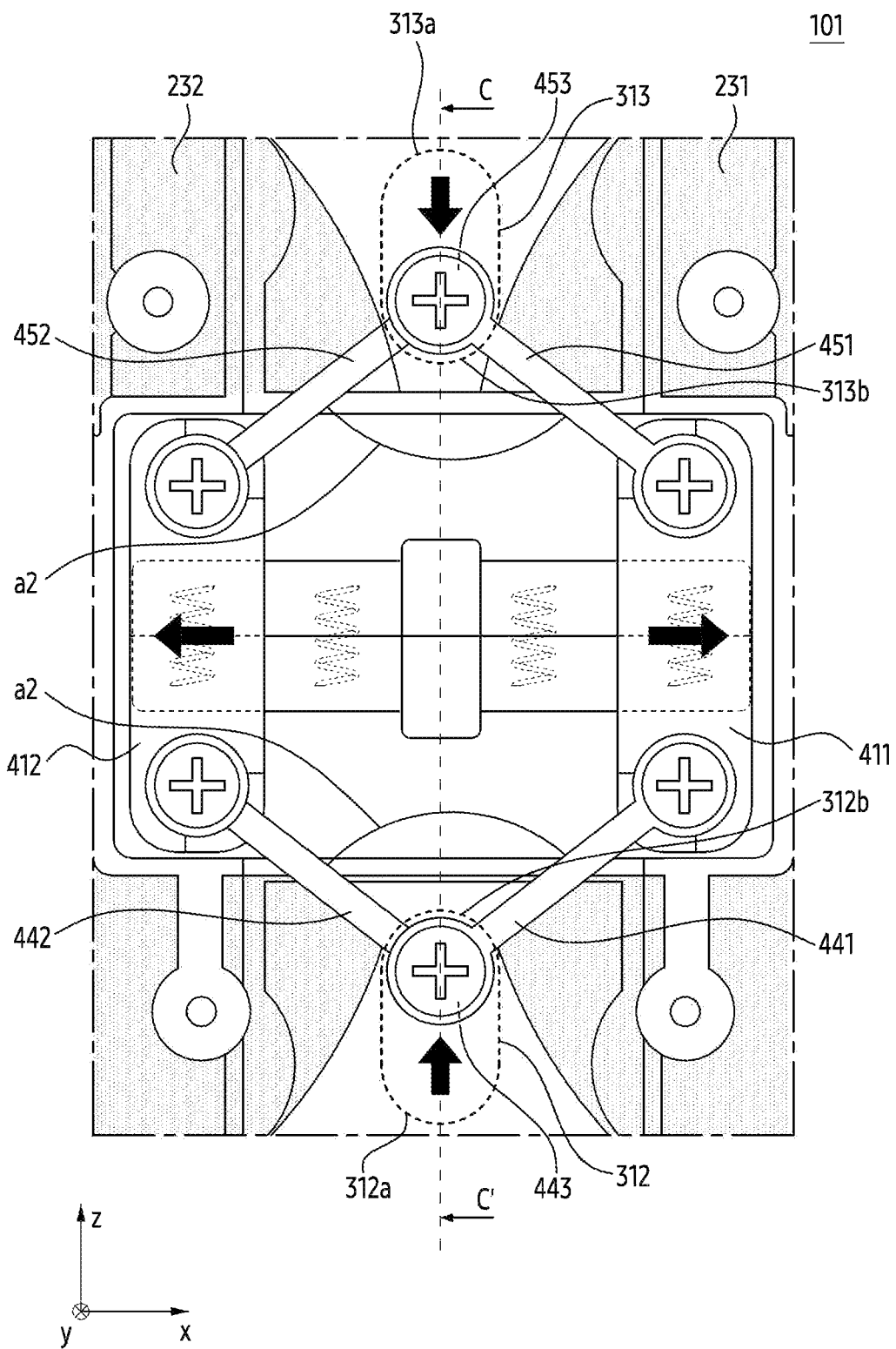
FIG. 9C is a top plan view of a resistance module when a distance between a first lens and a second lens is a second distance according to an embodiment of the disclosure.
Figure 9D:
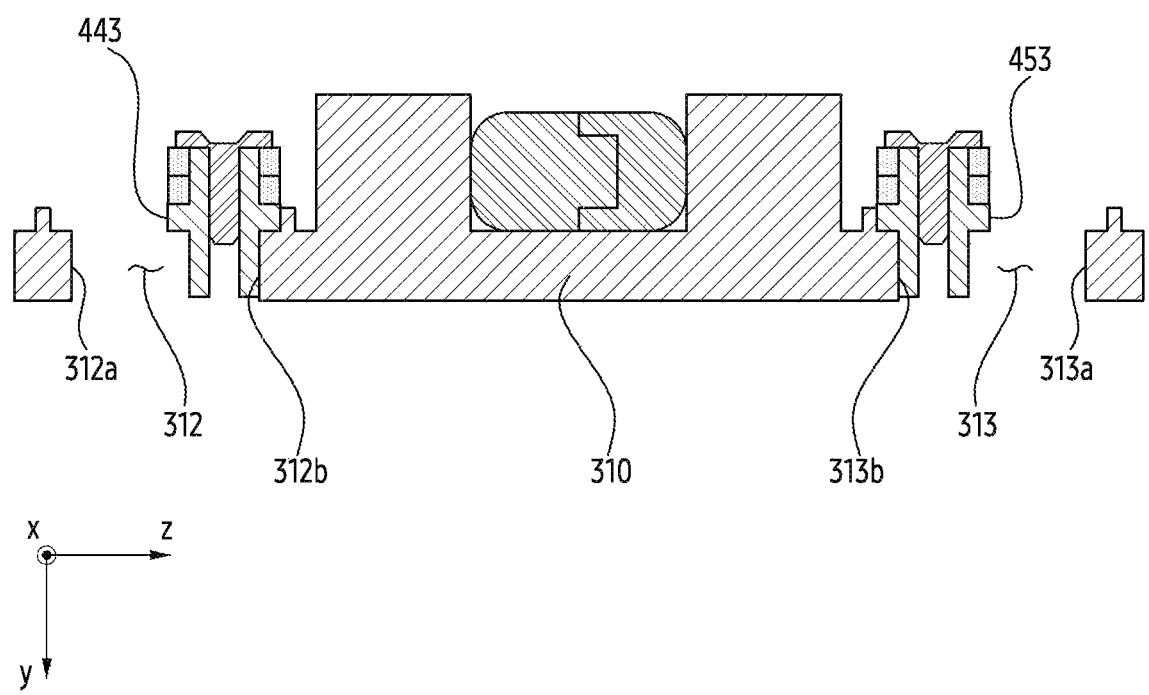
FIG. 9D is a cross-sectional view illustrating an example in which a resistance module is cut along line C-C' of FIG. 9C according to an embodiment of the disclosure.

FIG. 9A is a top plan view of a resistance module when a distance between a first lens and a second lens is a first distance according to an embodiment of the disclosure. FIG. 9B is a cross-sectional view illustrating an example in which a resistance module is cut along line B-B' of FIG. 9A according to an embodiment of the disclosure. FIG. 9C is a top plan view of a resistance module when a distance between a first lens and a second lens is a second distance according to an embodiment of the disclosure. FIG. 9D is a cross-sectional view illustrating an example in which a resistance module is cut along line C-C' of FIG. 9C according to an embodiment of the disclosure.

Referring to FIGS. 9A, 9B, 9C, and 9D, according to an embodiment of the disclosure, a first supporting member 310 may include a first guide space 312 and a second guide space 313.

According to an embodiment of the disclosure, the first guide space 312 may accommodate a first pin 443. The first pin 443 may be disposed within the first guide space 312. For example, the first pin 443 may be inserted into the first guide space 312. For example, the first pin 443 may penetrate the first guide space 312. According to an embodiment of the disclosure, the first guide space 312 may penetrate a first supporting member 310. However, it is not limited thereto. For example, the first guide space 312 may have a groove shape. For example, when the first guide space 312 has a groove shape, the first guide space 312 may be formed as at least a portion of the first supporting member 310 is recessed inward. For example, the first guide space 312 may be referred to as a first guide groove and/or a first guide opening. An end 312a of the first guide space 312 and another end 312b of the first guide space 312 may be spaced apart from each other. For example, the other end 312b of the first guide space 312 may be spaced apart from the end 312a of the first guide space 312 along a third direction (e.g., +z direction).

According to an embodiment of the disclosure, the second guide space 313 may penetrate the first supporting member 310. The second guide space 313 may accommodate a second pin 453. The second pin 453 may be disposed within the second guide space 313. For example, the second pin 453 may be inserted into the second guide space 313. For example, the second pin 453 may penetrate the second guide space 313. The second guide space 313 may penetrate the first supporting member 310. However, it is not limited thereto. For example, the second guide space 313 may have a groove shape. For example, when the second guide space 313 has a groove shape, the second guide space 313 may be formed as at least a portion of the first supporting member 310 is recessed inward. For example, the second guide space 313 may be referred to as a second guide groove and/or a second guide opening. According to an embodiment of the disclosure, the second guide space 313 may be separated from the first guide space 312. The second guide space 313 may be spaced apart from the first guide space 312. For example, the second guide space 313 may be spaced apart from the first guide space 312 along the third direction (e.g., +z direction). An end 313a of the second guide space 313 and another end 313b of the second guide space 313 may be spaced apart from each other. For example, the other end 313b of the second guide space 313 may be spaced apart from the end 313a of the second guide space 313 along a fourth direction (e.g., −z direction).

According to an embodiment of the disclosure, the first pin 443 may be coupled to the first supporting member 310. For example, the first pin 443 may be coupled to be movable with respect to the first supporting member 310. For example, the first pin 443 may be movable with respect to the first guide space 312. For example, while at least one of the first moving member 411 and the second moving member 412 is moving, the first pin 443 may be movable along the third direction (e.g., −z direction) and/or the fourth direction (e.g., −z direction) opposite to the third direction (e.g., +2 direction). For example, when a distance between a first lens (e.g., the first lens 231a of FIG. 4A) and a second lens (e.g., the second lens 232a of FIG. 4A) is a first distance (e.g., the first distance d1 of FIG. 4A), the first pin 443 may be positioned (or accommodated) at the end 312a of the first guide space 312. For example, when the distance between the first lens 231a and the second lens 232a is a second distance d2, the first pin 443 may be positioned (or accommodated) at the other end 312b of the first guide space 312 opposite to the end 312a of the first guide space 312.

According to an embodiment of the disclosure, as the first pin 443 is movable with respect to the first supporting member 310, movements of the first lens support 231 and the second lens support 232 may be linked. As the first pin 443 is movable with respect to the first supporting member 310, movements of the first moving member 411 and the second moving member 412 may be linked. For example, while the first moving member 411 moves along the first direction (e.g., the +x direction), the first pin 443 may move in the third direction (e.g., +z direction) within the first guide space 312, by a first connecting member 441 connected to the first moving member 411. For example, as the first pin 443 slides in the third direction (e.g., +z direction) with respect to the first guide space 312, a second connecting member 442 connected to the first pin 443 may rotate with respect to the first pin 443. The second moving member 412 connected to the second connecting member 442 may move in the second direction (e.g., −x direction), by a rotation of the second connecting member 442. As the second moving member 412 moves in the second direction (e.g., −x direction), the second lens support 232 coupled to the second moving member 412 may move along the second direction (e.g., −x direction).

According to an embodiment of the disclosure, an angle between the first connecting member 441 and the second connecting member 442 may be changed by movement of at least one of the first moving member 411 and the second moving member 412. For example, when a distance between the first lens 231a and the second lens 232a is the first distance d1, the angle between the first connecting member 441 and the second connecting member 442 may be a first angle a1. For example, while the first pin 443 is in contact with the end 312a of the first guide space 312, the angle between the first connecting member 441 and the second connecting member 442 may be the first angle a1. As the first moving member 411 and the second moving member 412 move in a direction away from each other, the angle between the first connecting member 441 and the second connecting member 442 may increase. For example, when the distance between the first lens 231a and the second lens 232a is the second distance d2, the angle between the first connecting member 441 and the second connecting member 442 may be a second angle a2 different from the first angle a1. For example, while the first pin 443 is in contact with the other end 312b of the first guide space 312, the angle between the first connecting member 441 and the second connecting member 442 may be the second angle a2. For example, the second angle a2 may be greater than the first angle a1. As the first moving member 411 and the second moving member 412 move in a direction approaching each other, the angle between the first connecting member 441 and the second connecting member 442 may decrease.

According to an embodiment of the disclosure, the second pin 453 may be coupled to the first supporting member 310. For example, the second pin 453 may be coupled to be movable with respect to the first supporting member 310. For example, the second pin 453 may be movable with respect to the second guide space 313. For example, while at least one of the first moving member 411 and the second moving member 412 is moving, the second pin 453 may be movable along the third direction (e.g., +z direction) and/or the fourth direction (e.g., −z direction) opposite to the third direction (e.g., +z direction). For example, when the distance between the first lens 231a and the second lens 232a is the first distance d1, the second pin 453 may be positioned (or accommodated) at the end 313a of the second guide space 313. For example, when the distance between the first lens 231a and the second lens 232a is the second distance d2, the second pin 453 may be positioned (or accommodated) at the other end 313b of the second guide space 313 opposite to the end 313a of the second guide space 313.

According to an embodiment of the disclosure, as the second pin 453 is movable with respect to the first supporting member 310, movements of the first lens support 231 and the second lens support 232 may be linked. As the second pin 453 is movable with respect to the first supporting member 310, movements of the first moving member 411 and the second moving member 412 may be linked. For example, while the first moving member 411 moves along the first direction (e.g., +x direction), the second pin 453 may move in the fourth direction (e.g., −z direction) within the second guide space 313, by the third connecting member 451 connected to the first moving member 411. For example, as the second pin 453 slides in the fourth direction (e.g., −z direction) with respect to the second guide space 313, the fourth connecting member 452 connected to the second pin 453 may rotate with respect to the second pin 453. The second moving member 412 connected to the fourth connecting member 452 may move in the second direction (e.g., −x direction), by rotation of the fourth connecting member 452. As the second moving member 412 moves in the second direction (e.g., −x direction), the second lens support 232 coupled to the second moving member 412 may move along the second direction (e.g., −x direction).

According to an embodiment of the disclosure, an angle between the third connecting member 451 and the fourth connecting member 452 may be changed by movement of at least one of the first moving member 411 and the second moving member 412. The angle between the third connecting member 451 and the fourth connecting member 452 may be substantially the same as the angle between the first connecting member 441 and the second connecting member 442. For example, when the distance between the first lens 231a and the second lens 232a is the first distance d1, the angle between the third connecting member 451 and the fourth connecting member 452 may be the first angle a1. For example, while the second pin 453 is in contact with the end 313a of the second guide space 313, the angle between the third connecting member 451 and the fourth connecting member 452 may be the first angle a1. As the first moving member 411 and the second moving member 412 move in a direction away from each other, the angle between the third connecting member 451 and the fourth connecting member 452 may increase. For example, when the distance between the first lens 231a and the second lens 232a is the second distance d2, the angle between the third connecting member 451 and the fourth connecting member 452 may be the second angle a2 different from the first angle a1. For example, while the second pin 453 is in contact with the other end 313b of the second guide space 313, the angle between the third connecting member 451 and the fourth connecting member 452 may be the second angle a2. As the first moving member 411 and the second moving member 412 move in a direction approaching each other, the angle between the third connecting member 451 and the fourth connecting member 452 may decrease.

As described above, the electronic device 101 according to an embodiment may provide a structure capable of linking movements of the plurality of moving members 410 by the first link structure 440 and the second link structure 450 disposed symmetrically with each other.

Figure 10A:
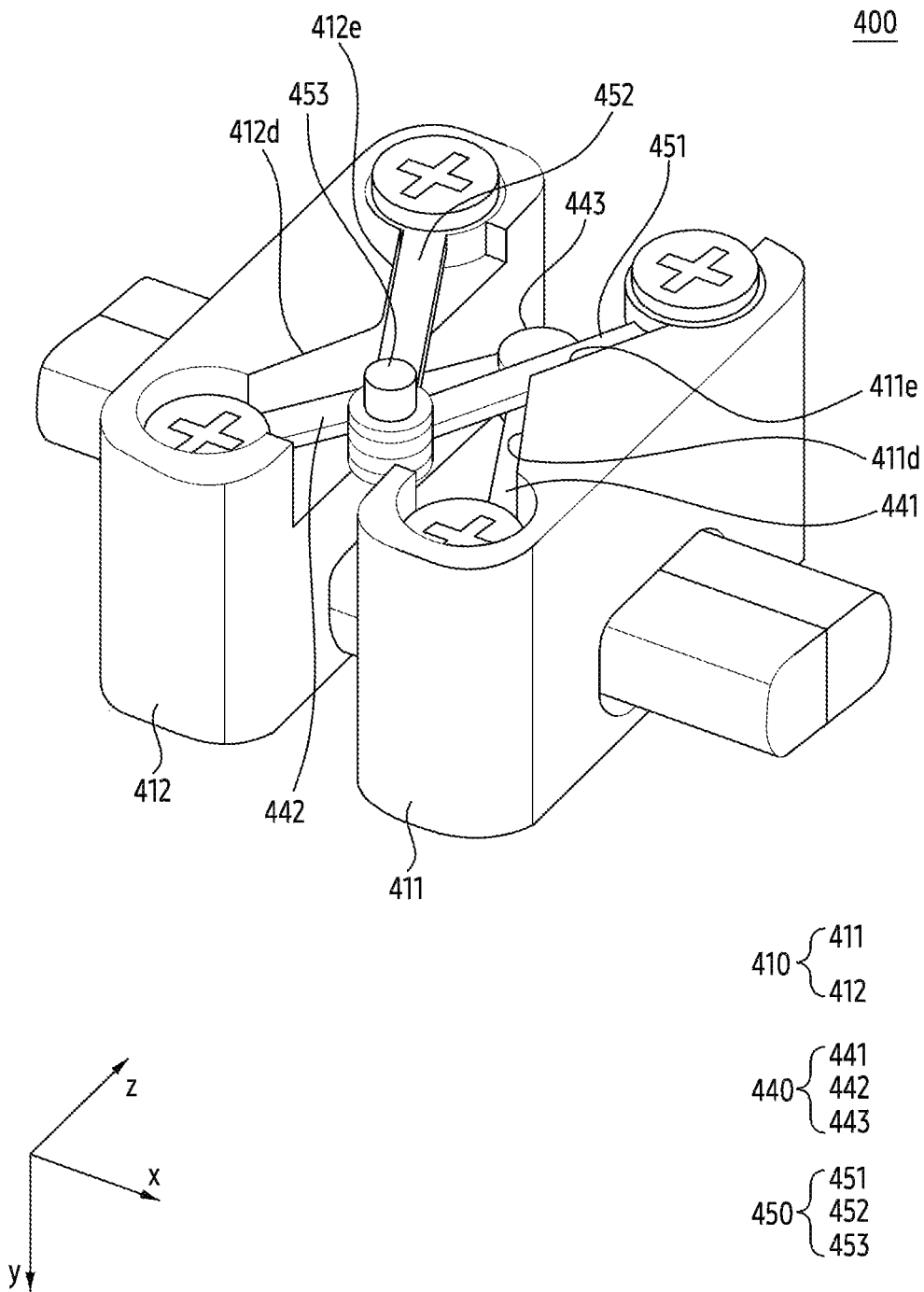
FIG. 10A is a perspective view of a resistance module according to an embodiment of the disclosure.
Figure 10B:
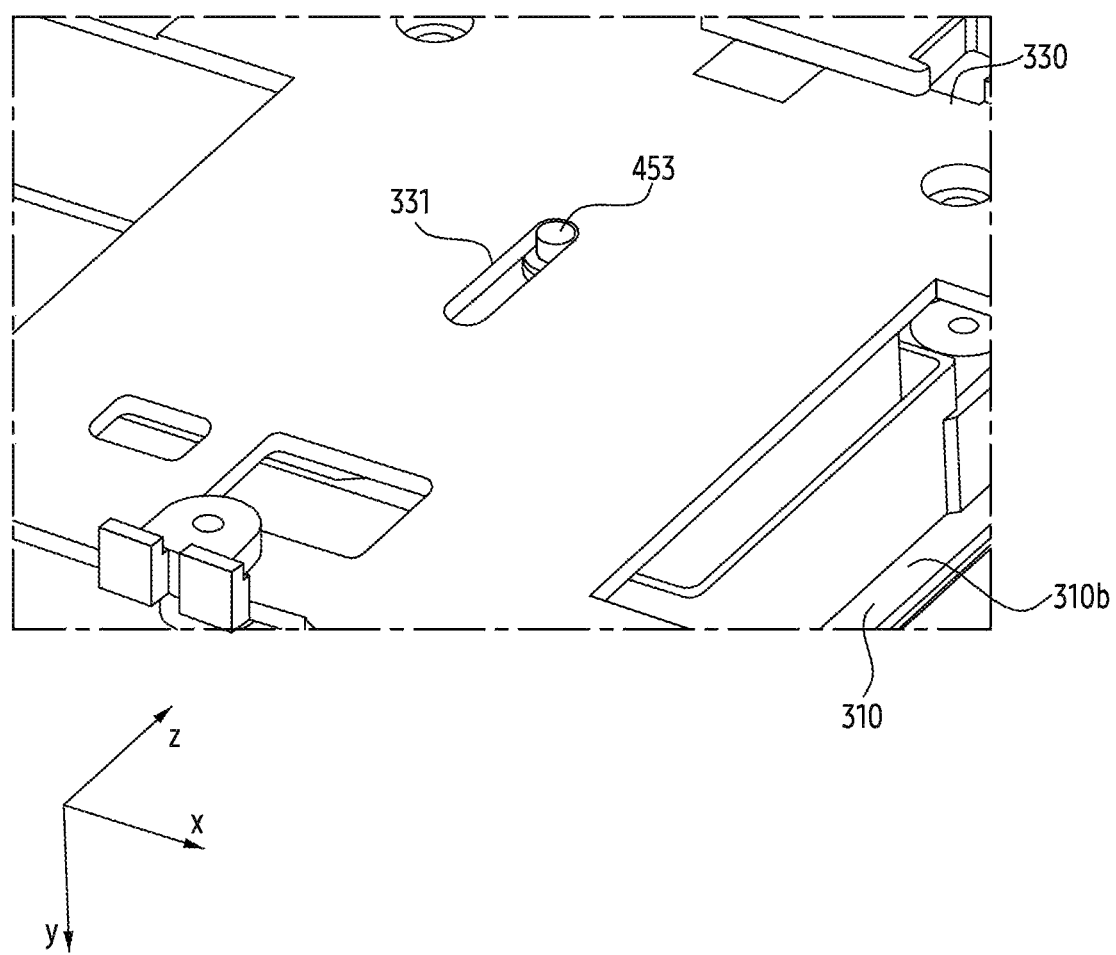
FIG. 10B is a perspective view illustrating a coupling relationship between a resistor module and an electronic device according to an embodiment of the disclosure.
Figure 10C:
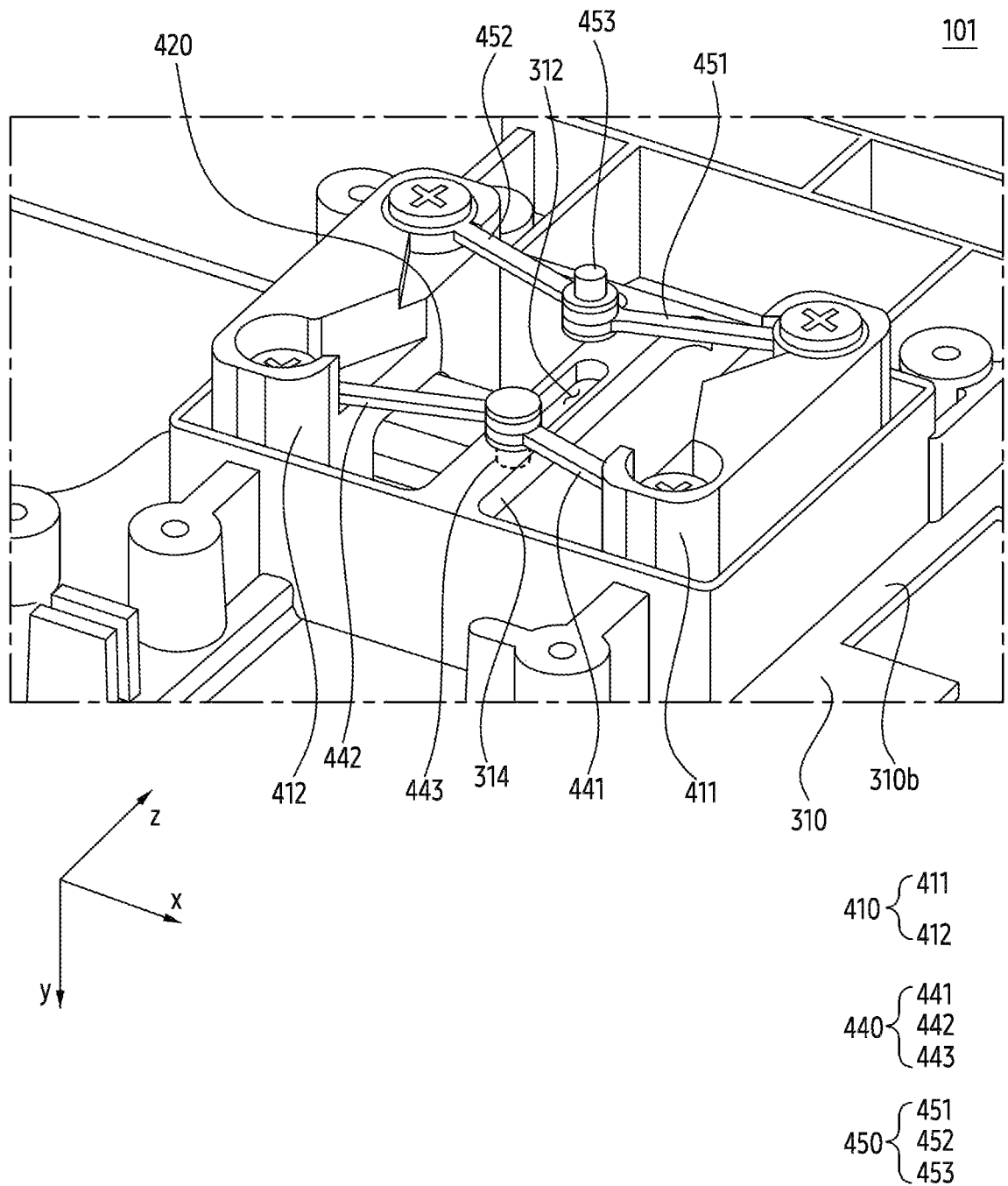
FIG. 10C is a perspective view illustrating a coupling relationship between a resistor module and an electronic device according to an embodiment of the disclosure.

FIG. 10A is a perspective view of a resistance module according to an embodiment of the disclosure. FIG. 10B is a perspective view illustrating a coupling relationship between a resistor module and an electronic device according to an embodiment of the disclosure. FIG. 10C is a perspective view illustrating a coupling relationship between a resistor module and an electronic device according to an embodiment of the disclosure.

Since a guide module 400 of FIGS. 10A, 10B, and 10C may be a guide module 400 in which a structure of a first link structure 440 and a second link structure 450 is changed from the guide module 400 of FIG. 8, redundant description will be omitted.

Referring to FIGS. 10A, 10B, and 10C, the first link structure 440 and the second link structure 450 may be disposed between a plurality of moving members 410. For example, a first connecting member 441, a second connecting member 442, and a first pin 443 may be covered (or surrounded) by a first moving member 411 and a second moving member 412. For example, a third connecting member 451, a fourth connecting member 452, and a second pin 453 may be covered (or surrounded) by the first moving member 411 and the second moving member 412.

According to an embodiment of the disclosure, the first link structure 440 may be disposed (or laminated) on the second link structure 450. For example, the first connecting member 441, the second connecting member 442, and the first pin 443 may be disposed (or laminated) on the third connecting member 451, the fourth connecting member 452, and the second pin 453.

According to an embodiment of the disclosure, the first moving member 411 may include a first guide groove 411d and a second guide groove 411e.

According to an embodiment of the disclosure, the first guide groove 411d may accommodate the first connecting member 441. For example, when a distance between a first lens (e.g., the first lens 231a of FIG. 4A) and a second lens (e.g., the second lens 232a of FIG. 4A) is a first distance (e.g., the first distance d1 in FIG. 4A), the first connecting member 441 may be accommodated (or positioned) in the first guide groove 411d. When the distance between the first lens 231a and the second lens 232a is a second distance (e.g., the second distance d2 of FIG. 4A), the first connecting member 441 may be positioned outside the first guide groove 411d. For example, the first guide groove 411d may be formed as a part of the first moving member 411 is recessed inward.

According to an embodiment of the disclosure, the second guide groove 411e may accommodate the third connecting member 451. For example, when the distance between the first lens 231a and the second lens 232a is the first distance d1, the third connecting member 451 may be accommodated (or positioned) in the second guide groove 411e. When the distance between the first lens 231a and the second lens 232a is the second distance d2, the third connecting member 451 may be positioned outside the second guide groove 411e. For example, the second guide groove 411e may be formed as a part of the first moving member 411 is recessed inward. The second guide groove 411e may form a step with respect to the first guide groove 411d. For example, the second guide groove 411e may be spaced apart from the first guide groove 411d along a third direction (e.g., +z direction). For example, the second guide groove 411e may be spaced apart from the first guide groove 411d along a direction (e.g., −y direction) in which another surface 310b of a first supporting member 310 faces.

According to an embodiment of the disclosure, the second moving member 412 may include a third guide groove 412d and a fourth guide groove 412e.

According to an embodiment of the disclosure, the third guide groove 412d may accommodate the second connecting member 442. For example, when the distance between the first lens 231a and the second lens 232a is the first distance d1, the second connecting member 442 may be accommodated (or positioned) in the third guide groove 412d. When the distance between the first lens 231a and the second lens 232a is the second distance d2, the second connecting member 442 may be positioned outside the third guide groove 412d. For example, the third guide groove 412d may be formed as a part of the second moving member 412 is recessed inward.

According to an embodiment of the disclosure, the fourth guide groove 412e may accommodate the fourth connecting member 452. For example, when the distance between the first lens 231a and the second lens 232a is the first distance d1, the fourth connecting member 452 may be accommodated (or positioned) in the fourth guide groove 412e. When the distance between the first lens 231a and the second lens 232a is the second distance d2, the fourth connecting member 452 may be positioned outside the fourth guide groove 412e. For example, the fourth guide groove 412e may be formed as a part of the second moving member 412 is recessed inward. The fourth guide groove 412e may form a step with respect to the third guide groove 412d. For example, the fourth guide groove 412e may be spaced apart from the third guide groove 412d along the third direction (e.g., +z direction). For example, the fourth guide groove 412e may be spaced apart from the third guide groove 412d along the direction (e.g., −y direction) in which the other surface 310b of the first supporting member 310 faces.

According to an embodiment of the disclosure, a first guide space 312 may be disposed (or laminated) on the plurality of friction members 420. The first guide space 312 may be disposed on a guide portion 314 of the first supporting member 310. The guide portion 314 may be disposed (or laminated) on the plurality of friction members 420. The guide portion 314 may be disposed between the plurality of moving members 410. For example, the guide portion 314 may be surrounded (or covered) by the plurality of moving members 410. The first guide space 312 may be formed as a part of the guide portion 314 is recessed inward.

According to an embodiment of the disclosure, the electronic device (e.g., the electronic device 101 of FIG. 4A) may further include a second supporting member 330.

According to an embodiment of the disclosure, the second supporting member 330 may be disposed (or laminated) on the first supporting member 310. For example, the second supporting member 330 may be fastened to the first supporting member 310. For example, the second supporting member 330 may overlap the first supporting member 310. For example, the second supporting member 330 may be referred to as one of a first housing (e.g., the first housing 210 of FIGS. 2A, 2B, and 2C) and a second bracket (e.g., the second bracket 272 of FIG. 3B). According to an embodiment of the disclosure, the second supporting member 330 may include a third guide space 331. The third guide space 331 may penetrate the second supporting member 330. The third guide space 331 may accommodate the second pin 453. The second pin 453 may be accommodated in the third guide space 331. For example, the second pin 453 may be inserted into the third guide space 331. For example, the second pin 453 may be movable with respect to the third guide space 331.

For example, the second pin 453 may move with respect to the third guide space 331, by movement of at least one of the first moving member 411 and the second moving member 412. The movement of the first link structure 440 and the second link structure 450 may be described through FIGS. 11A, 11B, 11C, and 11D.

Figure 11A:
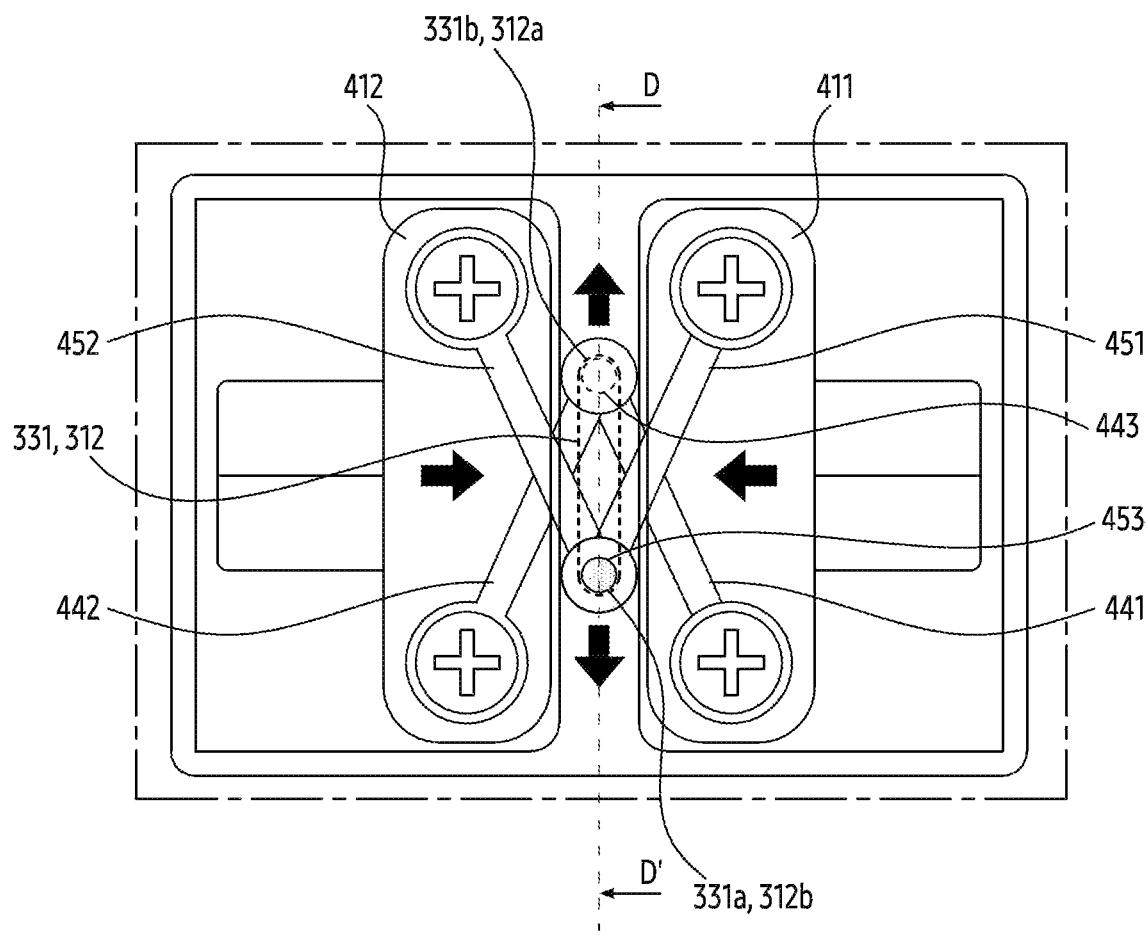
FIG. 11A is a top plan view of a resistance module when a distance between a first lens and a second lens is a first distance according to an embodiment of the disclosure.
Figure 11B:
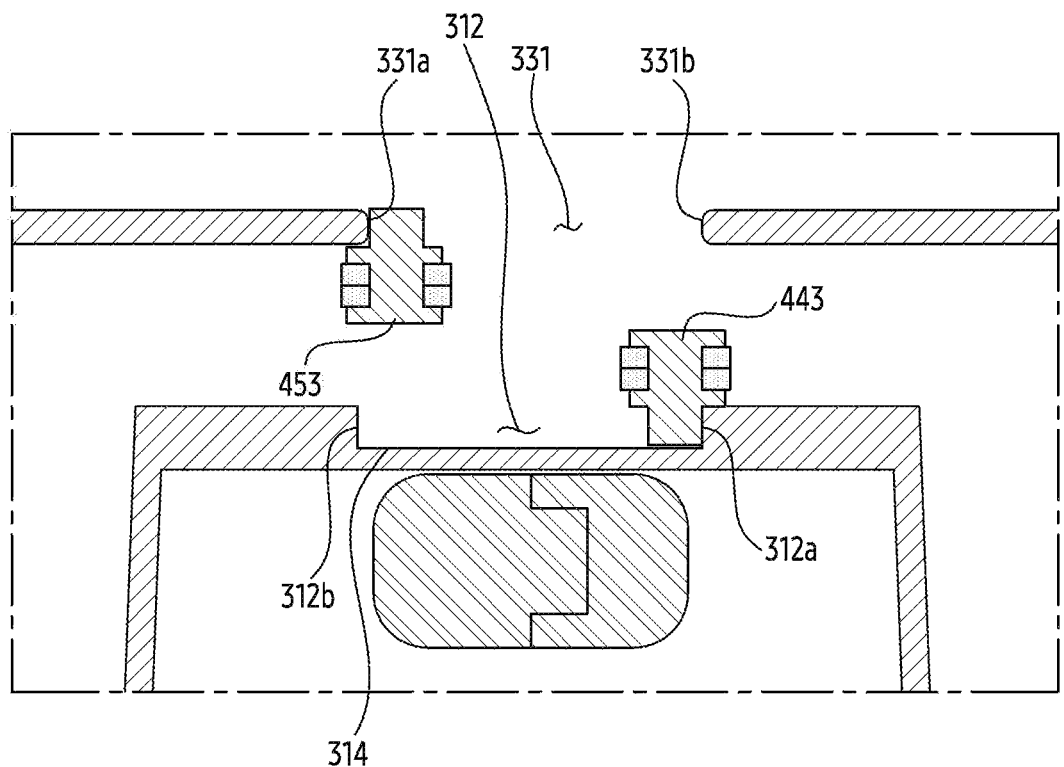
FIG. 11B is a cross-sectional view illustrating an example in which a resistance module is cut along line D-D' of FIG. 11A according to an embodiment of the disclosure.
Figure 11C:
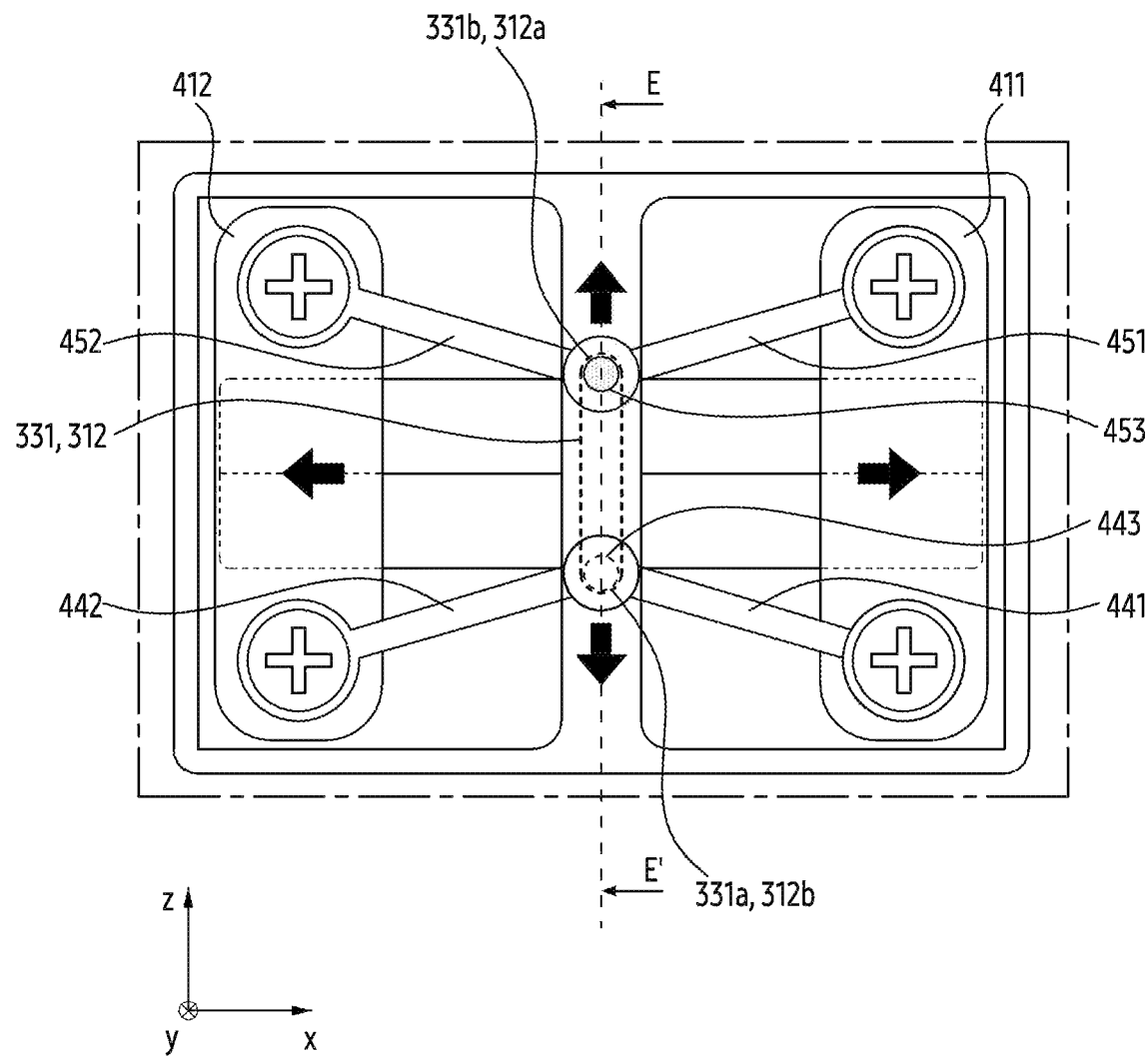
FIG. 11C is a top plan view of a resistance module when a distance between a first lens and a second lens is a second distance according to an embodiment of the disclosure.
Figure 11D:
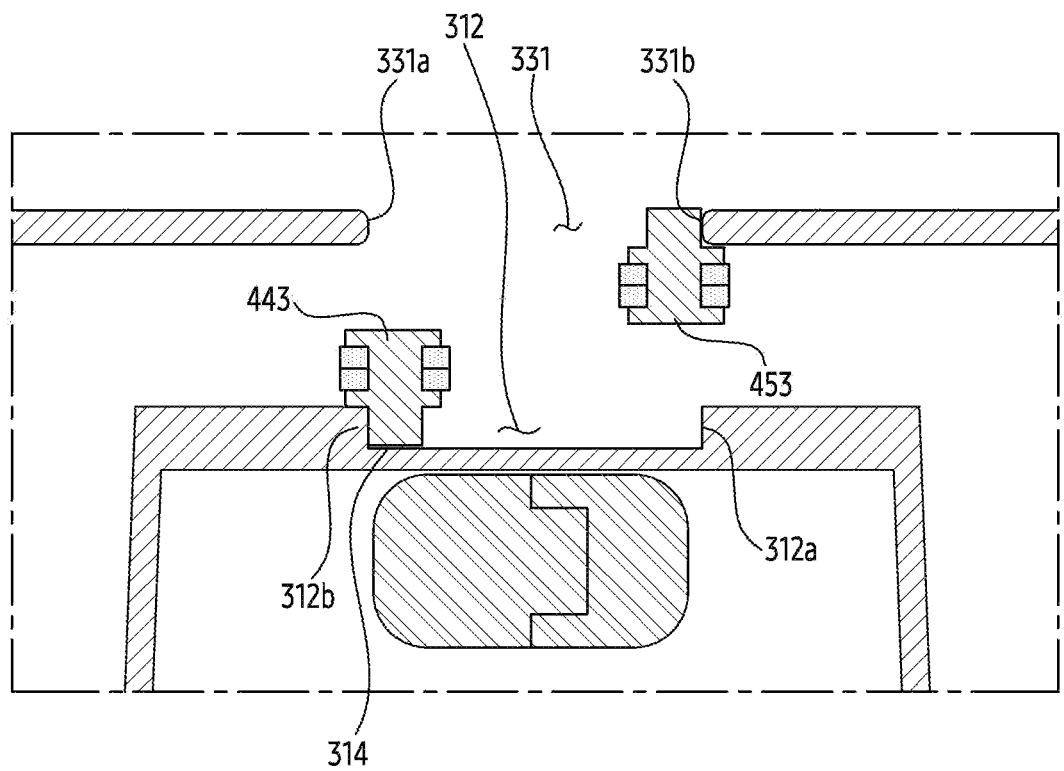
FIG. 11D is a cross-sectional view illustrating an example in which a resistance module is cut along line E-E' of FIG. 11A according to an embodiment of the disclosure.

FIG. 11A is a top plan view of a resistance module when a distance between a first lens and a second lens is a first distance of the disclosure. FIG. 11B is a cross-sectional view illustrating an example in which a resistance module is cut along line D-D' of FIG. 11A of the disclosure. FIG. 11C is a top plan view of a resistance module when a distance between a first lens and a second lens is a second distance of the disclosure. FIG. 11D is a cross-sectional view illustrating an example in which a resistance module is cut along line E-E' of FIG. 11A.

Referring to FIGS. 11A, 11B, 11C, and 11D, according to an embodiment of the disclosure, an end 331a of a third guide space 331 and another end 331b of the third guide space 331 may be spaced apart from each other. The other end 331b of the third guide space 331 may be opposite to the end 331a of the third guide space 331. For example, the other end 331b of the third guide space 331 may be spaced apart from the end 331a of the third guide space 331 along a third direction (e.g., +z direction).

According to an embodiment of the disclosure, the third guide space 331 may be disposed (or laminated) on a first guide space 312. The third guide space 331 may overlap the first guide space 312. For example, the third guide space 331 may be fully overlapped with the first guide space 312, but is not limited thereto. For example, an end 312a of the first guide space 312 may overlap the other end 331b of the third guide space 331. For example, another end 312b of the first guide space 312 may overlap the end 331a of the third guide space 331.

According to an embodiment of the disclosure, as a first pin 443 is movable with respect to a first supporting member 310, movements of a first lens support 231 and a second lens support 232 may be linked. As the first pin 443 is movable with respect to the first supporting member 310, movements of a first moving member 411 and a second moving member 412 may be linked. For example, while the first moving member 411 moves along a first direction (e.g., the +x direction), the first pin 443 may move in a fourth direction (e.g., -z direction) within the first guide space 312, by a first connecting member 441 connected to the first moving member 411. For example, as the first pin 443 slides in the fourth direction (e.g., -z direction) with respect to a guide portion 314, a second connecting member 442 connected to the first pin 443 may rotate with respect to the first pin 443. By a rotation of the second connecting member 442, the second moving member 412 connected to the second connecting member 442 may move in a second direction (e.g., -x direction). As the second moving member 412 moves in the second direction (e.g., -x direction), the second lens support 232 coupled to the second moving member 412 may move along the second direction (e.g., -x direction).

According to an embodiment of the disclosure, when a distance between a first lens (e.g., the first lens 231a of FIG. 4A) and a second lens (e.g., the second lens 232a of FIG. 4A) is a first distance (e.g., the first distance d1 of FIG. 4A), the second pin 453 may be positioned (or accommodated) at the end 331a of the third guide space 331. When the distance between the first lens 231a and the second lens 232a is a second distance (e.g., the second distance d2 of FIG. 4A), the second pin 453 may be positioned at the other end 331b of the third guide space 331. For example, while the first moving member 411 moves along the first direction (e.g., the +x direction), the second pin 453 may move in the third direction (e.g., +z direction) within the third guide space 331, by a third connecting member 451 connected to the first moving member 411. For example, as the second pin 453 slides in the third direction (e.g., +z direction) with respect to the third guide space 331, a fourth connecting member 452 connected to the second pin 453 may rotate with respect to the second pin 453. By rotation of the fourth connecting member 452, the second moving member 412 connected to the fourth connecting member 452 may move in the second direction (e.g., -x direction). As the second moving member 412 moves in the second direction (e.g., -x direction), the second lens support 232 coupled to the second moving member 412 may move along the second direction (e.g., -x direction).

As described above, the guide module 400 according to an embodiment may provide a structure capable of linking movements of the plurality of moving members 410 by the first link structure 440 and the second link structure 450 disposed between the plurality of moving members 410.

An electronic device may include a structure capable of changing a relative position between components so as to correspond to a user's body shape while being worn by the user. When components are moved by the structure, in case that resistance force is not provided to at least a part of the components, the user may not be able to stably move each of the components. An electronic device may require a structures for providing resistance force to movement of components while saving space in the electronic device.

An electronic device (e.g., the electronic device 101 of FIGS. 4A and 4B) is provided. The electronic device may comprise a first lens support (e.g., the first lens support 231 of FIGS. 4A and 4B). According to an embodiment of the disclosure, the electronic device may comprise a second lens support (e.g., the second lens support 232 of FIGS. 4A and 4B) movable with respect to the first lens support. According to an embodiment of the disclosure, the electronic device may comprise a first moving member (e.g., the first moving member 411 of FIG. 4A) coupled to the first lens support to move together with the first lens support. According to an embodiment of the disclosure, the electronic device may comprise a second moving member (e.g., the second moving member 412 of FIG. 4A) coupled to the second lens support to move together with the second lens support. According to an embodiment of the disclosure, the electronic device may comprise a plurality of friction members (e.g., the plurality of friction members 420 of FIG. 4A) penetrating the first moving member and the second moving member and movable with respect to each other. According to an embodiment of the disclosure, the electronic device may comprise at least one deforming member (e.g., the at least one deforming member 430 of FIG. 5A) disposed between the plurality of friction members and configured to press each of the plurality of friction members in a direction away from each other friction member, to cause friction force by a contact between the plurality of friction members and the first moving member and a contact between the plurality of friction members and the second moving member.

According to an embodiment of the disclosure, the electronic device may provide a structure in which a distance between the first lens support and the second lens support may be precisely adjusted by a plurality of friction members providing friction force to the first moving member and the second moving member.

According to an embodiment of the disclosure, the first moving member may include a first opening (e.g., the first opening 411b of FIG. 5A) penetrating the first moving member and accommodating the plurality of friction members. According to an embodiment of the disclosure, the second moving member may include a second opening (e.g., the second opening 412b of FIG. 5A) penetrating the second moving member and accommodating the plurality of friction members. According to an embodiment of the disclosure, each of the plurality of friction members may be in contact with an inner surface of the first moving member surrounding the first opening and an inner surface of the second moving member surrounding the second opening, by the at least one deforming member.

According to an embodiment of the disclosure, the electronic device may provide a structure in which a distance between the first lens support and the second lens support may be precisely adjusted by a plurality of moving members and a plurality of friction members, which are in contact with each other within openings.

According to an embodiment of the disclosure, the plurality of friction members may include a first part (e.g., the first part 423 of FIG. 5B) having a cross-sectional area larger than a cross-sectional area of each of the first opening and the second opening. According to an embodiment of the disclosure, the plurality of friction members may include a second part (e.g., the second part 424 of FIG. 5B) connected to an end of the first part and inserted into the first opening. According to an embodiment of the disclosure, the plurality of friction members may include a third part (e.g., the third part 425 of FIG. 5B) connected to another end of the first part and inserted into the second opening.

According to an embodiment of the disclosure, the electronic device may provide a structure in which a minimum distance between the first lens support and the second lens support is limited by the first part thicker than the second part and the third part.

According to an embodiment of the disclosure, the first moving member may include a plurality of first irregularities (e.g., the plurality of first irregularities 413 of FIG. 7B) disposed in at least one of the first opening and the second opening. According to an embodiment of the disclosure, the plurality of friction members may include a plurality of second irregularities (e.g., the plurality of second irregularities 426 of FIG. 7A) arranged to correspond to the plurality of first irregularities.

According to an embodiment of the disclosure, the electronic device may provide a structure in which a distance between the first lens support and the second lens support may be precisely adjusted by the plurality of first irregularities and the plurality of second irregularities for increasing a contact area between the plurality of moving members and the plurality of friction members.

According to an embodiment of the disclosure, each of the plurality of friction members may have a shape parallel to a moving direction of the first lens support and the second lens support. According to an embodiment of the disclosure, the at least one deforming member may be configured to press each of the plurality of friction members in a direction perpendicular to the moving direction.

According to an embodiment of the disclosure, the electronic device may provide a structure in which a distance between the first lens support and the second lens support may be precisely adjusted by at least one deforming member in which force in a direction perpendicular to the movement direction is applied to each of the plurality of friction members.

According to an embodiment of the disclosure, the electronic device may include at least one fastening member (e.g., the at least one first fastening member f1 of FIG. 4C) fastening the first moving member to the first lens support by penetrating the first lens support and the first moving member.

According to an embodiment of the disclosure, the electronic device may provide a structure in which a distance between the first lens support and the second lens support may be precisely adjusted by a plurality of friction members providing friction force to each of the first moving member coupled to the first lens support and the second moving member coupled to the second lens support.

According to an embodiment of the disclosure, the at least one deforming member may include a plurality of deforming members spaced apart from each other in a moving direction of the first lens support and the second lens support.

According to an embodiment of the disclosure, the electronic device may provide a structure in which a distance between the first lens support and the second lens support may be precisely adjusted by the plurality of deforming members in which force for contacting the plurality of friction members and the plurality of moving members is applied to each of the plurality of friction members.

According to an embodiment of the disclosure, the plurality of friction members may include a plurality of grooves accommodating the at least one deforming member.

According to an embodiment of the disclosure, the electronic device may provide a structure in which at least one deforming member may be disposed between the plurality of friction members by a plurality of grooves formed in each of the plurality of friction members.

According to an embodiment of the disclosure, the electronic device may comprise a first connecting member (e.g., the first connecting member 441 of FIG. 8), an end of which coupled to the first moving member. According to an embodiment of the disclosure, the electronic device may comprise a second connecting member (e.g., the second connecting member 442 of FIG. 8), an end of which coupled to the second moving member. According to an embodiment of the disclosure, the electronic device may comprise a first pin (e.g., the first pin 443 in FIG. 8) movably coupling the first connecting member and the second connecting member, by penetrating another end of the first connecting member and another end of the second connecting member. According to an embodiment of the disclosure, the electronic device may comprise a third connecting member (e.g., the third connecting member 451 of FIG. 8), an end of which coupled to the first moving member. According to an embodiment of the disclosure, the electronic device may comprise a fourth connecting member (e.g., the fourth connecting member 452 of FIG. 8), an end of which coupled to the second moving member. According to an embodiment of the disclosure, the electronic device may comprise a second pin (e.g., the second pin 453 of FIG. 8) movably coupling the third connecting member and the fourth connecting member by penetrating another end of the third connecting member and another end of the fourth connecting member. According to an embodiment of the disclosure, a first angle between the first connecting member and the second connecting member may be changed by a movement of at least one of the first moving member and the second moving member. According to an embodiment of the disclosure, a second angle between the third connecting member and the fourth connecting member may be same as the first angle, and changed by the movement of the at least one of the first moving member and the second moving member.

According to an embodiment of the disclosure, the electronic device may provide a structure in which a distance between the first lens support and the second lens support may be precisely adjusted by link structures for linking movements of the first moving member and the second moving member.

According to an embodiment of the disclosure, the first angle and the second angle may increase as the first moving member and the second moving member move away from each other.

According to an embodiment of the disclosure, the electronic device may provide a structure in which a distance between the first lens support and the second lens support may be precisely adjusted by link structures for linking movements of the first moving member and the second moving member.

According to an embodiment of the disclosure, the plurality of friction members may be disposed between the first pin and the second pin.

According to an embodiment of the disclosure, the electronic device may provide a structure in which a distance between the first lens support and the second lens support may be precisely adjusted by a first link structure and a second link structure, which are disposed symmetrically with each other based on the plurality of friction members.

According to an embodiment of the disclosure, the electronic device includes a supporting member (e.g., the first supporting member 310 of FIG. 4B) including a first guide space into which the first pin is inserted, and a second guide space into which the second pin is inserted. According to an embodiment of the disclosure, the first pin may be movable within the first guide space by a movement of the first lens support with respect to the supporting member. According to an embodiment of the disclosure, the second pin may be movable within the second guide space by a movement of the second lens support with respect to the supporting member.

According to an embodiment of the disclosure, the first connecting member, the second connecting member, and the first pin may be laminated on the third connecting member, the fourth connecting member and the second pin.

According to an embodiment of the disclosure, the electronic device may include a first supporting member (e.g., the first supporting member 310 of FIG. 4B) including a first guide space (e.g., the first guide space 312 of FIG. 10C) into which the first pin is inserted. According to an embodiment of the disclosure, the electronic device may include a second supporting member (e.g., the third guide space 331 of FIG. 10B) including a second guide space (e.g., the second supporting member 330 of FIG. 10B) into which the second pin is inserted, and disposed on the first supporting member.

According to an embodiment of the disclosure, the electronic device may include a first rack gear (e.g., the first rack gear 231*b* of FIG. 4A) coupled to the first lens support and extending toward the second lens support. According to an embodiment of the disclosure, the electronic device may include a second rack gear (e.g., the second rack gear 232*b* of FIG. 4A) coupled to the second lens support and extending toward the first lens support. According to an embodiment of the disclosure, the electronic device may include a pinion gear (e.g., the pinion gear 320 of FIG. 4A) disposed between the first rack gear and the second rack gear.

A head mounted display device is provided. According to an embodiment of the disclosure, the head mounted display device may comprise a first lens support coupled to a first lens aligned with an eye of a user when the head mounted display device is worn by the user. According to an embodiment of the disclosure, the head mounted display device may comprise a second lens support movable with respect to the first lens support and coupled to a second lens aligned with another eye of the user when the head mounted display device is worn by the user. According to an embodiment of the disclosure, the head mounted display device may comprise a first moving member coupled to the first lens support to move together with the first lens support. According to an embodiment of the disclosure, the head mounted display device may comprise a second moving member coupled to the second lens support to move together with the second lens support. According to an embodiment of the disclosure, the head mounted display device may comprise a plurality of friction members extending in a moving direction of the first lens support and the second lens support to penetrate the first moving member and the second moving member and movable with respect to each other. According to an embodiment of the disclosure, the head mounted display device may comprise at least one deforming member disposed between the plurality of friction members and configured to press each of the plurality of friction members in a direction perpendicular to the moving direction, to cause friction force by a contact between the plurality of friction members and the first moving member and a contact between the plurality of friction members and the second moving member.

According to an embodiment of the disclosure, the first moving member may include a first opening (e.g., the first opening 411*b* of FIG. 5A) penetrating the first moving member and accommodating the plurality of friction members. According to an embodiment of the disclosure, the second moving member may include a second opening (e.g., the second opening 412*b* of FIG. 5A) penetrating the second moving member and accommodating the plurality of friction members. According to an embodiment of the disclosure, each of the plurality of friction members may be in contact with an inner surface of the first moving member surrounding the first opening and an inner surface of the second moving member surrounding the second opening, by the at least one deforming member.

According to an embodiment of the disclosure, the electronic device may provide a structure in which a distance between the first lens support and the second lens support may be precisely adjusted by a plurality of moving members and a plurality of friction members, which are in contact with each other within openings.

According to an embodiment of the disclosure, the head mounted display device may include at least one fastening member (e.g., the at least one first fastening member f1 of FIG. 4C) fastening the first moving member to the first lens support by penetrating the first lens support and the first moving member.

According to an embodiment of the disclosure, the electronic device may provide a structure in which a distance between the first lens support and the second lens support may be precisely adjusted by the plurality of friction members providing friction force to each of the first moving member coupled to the first lens support and the second moving member coupled to the second lens support.

According to an embodiment of the disclosure, the at least one deforming member may include a plurality of deforming members spaced apart from each other in a moving direction of the first lens support and the second lens support.

According to an embodiment of the disclosure, the electronic device may provide a structure in which a distance between the first lens support and the second lens support may be precisely adjusted by the plurality of friction members in which force for contacting the plurality of friction members and the plurality of moving members applies to each of the plurality of friction members.

According to an embodiment of the disclosure, the head mounted display device may include a first connecting member (e.g., the first connecting member 441 of FIG. 8), an end of which coupled to the first moving member. According to an embodiment of the disclosure, the head mounted display device may include a second connecting member (e.g., the second connecting member 442 of FIG. 8), an end of which coupled to the second moving member. According to an embodiment of the disclosure, the head mounted display device may include a first pin (e.g., the first pin 443 of FIG. 8) movably coupling the first connecting member and the second connecting member, by penetrating another end of the first connecting member and another end of the second connecting member. According to an embodiment of the disclosure, the head mounted display device may include a third connecting member (e.g., the third connecting member 451 of FIG. 8), an end of which coupled to the first moving member. According to an embodiment of the disclosure, the head mounted display device may include a fourth connecting member (e.g., the fourth connecting member 452 of FIG. 8), an end of which coupled to the second moving member. According to an embodiment of the disclosure, the head mounted display device may include a second pin (e.g., the second pin 453 of FIG. 8) movably coupling the third connecting member and the fourth connecting member by penetrating another end of the third connecting member and another end of the fourth connecting member. According to an embodiment of the disclosure, a first angle between the first connecting member and the second connecting member may be changed by a movement of at least one of the first moving member and the second moving member. According to an embodiment of the disclosure, a second angle between the third connecting member and the fourth connecting member may be same as the first angle, and changed by the movement of the at least one of the first moving member and the second moving member.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means."

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first lens support;
a second lens support movable with respect to the first lens support;
a first moving member coupled to the first lens support to move together with the first lens support;
a second moving member coupled to the second lens support to move together with the second lens support;
a plurality of friction members penetrating the first moving member and the second moving member and movable with respect to each other; and
at least one deforming member disposed between the plurality of friction members and configured to press each of the plurality of friction members in a direction away from each other friction member.

2. The electronic device of claim 1,
wherein the first moving member includes a first opening penetrating the first moving member and accommodating the plurality of friction members,
wherein the second moving member includes a second opening penetrating the second moving member and accommodating the plurality of friction members, and
wherein each of the plurality of friction members is in contact with an inner surface of the first moving member surrounding the first opening and an inner surface of the second moving member surrounding the second opening, to cause friction force by a contact between the plurality of friction members and the first moving member and a contact between the plurality of friction members and the second moving member.

3. The electronic device of claim 2, wherein the plurality of friction members includes:
a first part having a cross-sectional area larger than a cross-sectional area of first opening and a cross-sectional area of second opening;
a second part connected to an end of the first part and inserted into the first opening; and
a third part connected to another end of the first part and inserted into the second opening.

4. The electronic device of claim 2,
wherein the first moving member further includes a plurality of first irregularities disposed in the first opening, and
wherein the plurality of friction members includes a plurality of second irregularities arranged to correspond to the plurality of first irregularities.

5. The electronic device of claim 1,
wherein each of the plurality of friction members has a shape parallel to a moving direction of the first lens support and the second lens support, and
wherein the at least one deforming member is configured to press each of the plurality of friction members in a direction perpendicular to the moving direction.

6. The electronic device of claim 1, further comprising:
at least one fastening member fastening the first moving member to the first lens support by penetrating the first lens support and the first moving member.

7. The electronic device of claim 1, wherein the at least one deforming member includes a plurality of deforming members spaced apart from each other in a moving direction of the first lens support and the second lens support.

8. The electronic device of claim 1, wherein the plurality of friction members includes a plurality of grooves accommodating the at least one deforming member.

9. The electronic device of claim 1, further comprising:
a first connecting member, an end of which coupled to the first moving member,
a second connecting member, an end of which coupled to the second moving member,
a first pin movably coupling the first connecting member and the second connecting member, by penetrating another end of the first connecting member and another end of the second connecting member,
a third connecting member, an end of which coupled to the first moving member,
a fourth connecting member, an end of which coupled to the second moving member, and
a second pin movably coupling the third connecting member and the fourth connecting member by penetrating another end of the third connecting member and another end of the fourth connecting member,
wherein an angle between the first connecting member and the second connecting member is same as an angle between the third connecting member and the fourth connecting member and changes by a movement of at least one of the first moving member and the second moving member.

10. The electronic device of claim 9, wherein the angle between the first connecting member and the second connecting member increases as the first moving member and the second moving member move away from each other.

11. The electronic device of claim 9, wherein the plurality of friction members is disposed between the first pin and the second pin.

12. The electronic device of claim 9, further comprising:
a supporting member,
wherein the supporting member includes:
a first guide space into which the first pin is inserted, and
a second guide space into which the second pin is inserted,
wherein the first pin is movable within the first guide space by a movement of the first lens support with respect to the supporting member, and wherein the second pin is movable within the second guide space by a movement of the second lens support with respect to the supporting member.

13. The electronic device of claim 9, wherein the first connecting member, the second connecting member, and the first pin is laminated on the third connecting member, the fourth connecting member and the second pin.

14. The electronic device of claim 9, further comprising:
a first supporting member including a first guide space into which the first pin is inserted; and
a second supporting member including a second guide space into which the second pin is inserted, and disposed on the first supporting member.

15. The electronic device of claim 1, further comprising:
a first rack gear coupled to the first lens support and extending toward the second lens support;
a second rack gear coupled to the second lens support and extending toward the first lens support; and
a pinion gear disposed between the first rack gear and the second rack gear.

16. A head mounted display device comprising:
a first lens support coupled to a first lens aligned with an eye of a user when the head mounted display device is worn by the user;
a second lens support movable with respect to the first lens support and coupled to a second lens aligned with another eye of the user when the head mounted display device is worn by the user;
a first moving member coupled to the first lens support to move together with the first lens support;
a second moving member coupled to the second lens support to move together with the second lens support;
a plurality of friction members extending in a moving direction of the first lens support and the second lens support to penetrate the first moving member and the second moving member and movable with respect to each other; and
at least one deforming member disposed between the plurality of friction members and configured to press each of the plurality of friction members in a direction perpendicular to the moving direction.

17. The head mounted display device of claim 16,
wherein the first moving member includes a first opening penetrating the first moving member and accommodating the plurality of friction members,
wherein the second moving member includes a second opening penetrating the second moving member and accommodating the plurality of friction members,
wherein each of the plurality of friction members is in contact with an inner surface of the first moving member surrounding the first opening and an inner surface of the second moving member surrounding the second opening, to cause friction force by a contact between the plurality of friction members and the first moving member and a contact between the plurality of friction members and the second moving member,
wherein the head mounted display device further includes at least one fastening member fastening the first moving member to the first lens support by penetrating the first lens support and the first moving member, and
wherein the at least one deforming member includes a plurality of deforming members spaced apart from each other in a moving direction of the first lens support and the second lens support.

18. The head mounted display device of claim 16,
wherein the head mounted display device further includes:
a first connecting member, an end of which coupled to the first moving member,
a second connecting member, an end of which coupled to the second moving member,
a first pin movably coupling the first connecting member and the second connecting member, by penetrating another end of the first connecting member and another end of the second connecting member,
a third connecting member, an end of which coupled to the first moving member,
a fourth connecting member, an end of which coupled to the second moving member, and
a second pin movably coupling the third connecting member and the fourth connecting member by penetrating another end of the third connecting member and another end of the fourth connecting member, and
wherein an angle between the first connecting member and the second connecting member is same as an angle between the third connecting member and the fourth connecting member and changes by a movement of at least one of the first moving member and the second moving member.

19. The head mounted display device of claim 18, wherein the angle between the first connecting member and the second connecting member increases as the first moving member and the second moving member move away from each other.

20. The head mounted display device of claim 18, wherein the plurality of friction members is disposed between the first pin and the second pin.

* * * * *